(12) United States Patent
Thomas et al.

(10) Patent No.: US 6,750,818 B2
(45) Date of Patent: Jun. 15, 2004

(54) METHOD AND APPARATUS TO COMPUTE THE GEOLOCATION OF A COMMUNICATION DEVICE USING ORTHOGONAL PROJECTIONS

(75) Inventors: John K. Thomas, Erie, CO (US); Anand P. Narayan, Boulder, CO (US)

(73) Assignee: TensorComm, Inc., Westminster, CO (US)

( * ) Notice: Subject to any disclaimer, the term of this patent is extended or adjusted under 35 U.S.C. 154(b) by 0 days.

(21) Appl. No.: 10/178,541

(22) Filed: Jun. 25, 2002

(65) Prior Publication Data

US 2004/0017311 A1 Jan. 29, 2004

Related U.S. Application Data

(60) Provisional application No. 60/348,106, filed on Jan. 15, 2002, provisional application No. 60/333,143, filed on Nov. 27, 2001, provisional application No. 60/331,480, filed on Nov. 16, 2001, provisional application No. 60/326,199, filed on Oct. 2, 2001, provisional application No. 60/325,215, filed on Sep. 28, 2001, and provisional application No. 60/251,432, filed on Dec. 4, 2000.

(51) Int. Cl.[7] ............................................. G01S 3/02
(52) U.S. Cl. ........................ 342/450; 342/451; 342/457
(58) Field of Search ................. 342/450, 451, 342/457

(56) References Cited

U.S. PATENT DOCUMENTS

| | | | |
|---|---|---|---|
| 5,343,493 A | 8/1994 | Karimullah | |
| 5,812,086 A | 9/1998 | Bertiger et al. | |
| 5,844,521 A | 12/1998 | Stephens et al. | |
| 5,859,613 A | 1/1999 | Otto | |
| 5,995,499 A | 11/1999 | Hottinen et al. | |
| 6,104,712 A | 8/2000 | Robert et al. | |
| 6,141,332 A | 10/2000 | Lavean | |
| 6,175,587 B1 * | 1/2001 | Madhow et al. | 375/148 |
| 6,201,799 B1 | 3/2001 | Huang et al. | |
| 6,233,459 B1 | 5/2001 | Sullivan et al. | |
| 6,285,319 B1 | 9/2001 | Rose | |
| 6,304,618 B1 | 10/2001 | Hafeez et al. | |
| 6,310,704 B1 * | 10/2001 | Dogan et al. | 359/127 |
| 6,321,090 B1 | 11/2001 | Soliman | |
| 6,327,471 B1 | 12/2001 | Song | |
| 6,330,460 B1 * | 12/2001 | Wong et al. | 455/562 |
| 6,351,235 B1 | 2/2002 | Stilp | |
| 6,351,642 B1 | 2/2002 | Corbett et al. | |
| 6,359,874 B1 | 3/2002 | Dent | |
| 6,377,636 B1 | 4/2002 | Paulraj et al. | |
| 6,459,693 B1 | 10/2002 | Park et al. | |
| 2001/0003443 A1 | 6/2001 | Velazquez et al. | |
| 2001/0020912 A1 | 9/2001 | Naruse et al. | |
| 2001/0021646 A1 | 9/2001 | Antonucci et al. | |
| 2002/0001299 A1 | 1/2002 | Petch et al. | |

* cited by examiner

Primary Examiner—Theodore M. Blum

(57) ABSTRACT

A novel method and apparatus for determining geolocation of a mobile transmitter is provided. The apparatus and the method utilize an orthogonal projection of a source signal to canceling interference from the source signal in the geolocation process.

67 Claims, 8 Drawing Sheets

METHOD AND APPARATUS TO COMPUTE THE GEOLOCATION OF A COMMUNICATION DEVICE USING ORTHOGONAL PROJECTIONS

CROSS-REFERENCE TO RELATED APPLICATIONS

This application makes reference to U.S. patent application Ser. No. 10/247,836, entitled "Serial Receiver Design for a Coded Signal Processing Engine," filed Sep. 20, 2002; U.S. Provisional Patent Application No. 60/348,106, entitled "Serial Receiver Design for a Coded Signal Processing Engine," filed Jan. 15, 2002; U.S. Provisional Patent Application No. 60/333,143, entitled "Method and Apparatus to Compute the Geolocation of a Communication Device Using Orthogonal Projection Methods," filed Nov. 27, 2001; U.S. Provisional Patent Application No. 60/331,480, entitled "Construction of an Interference Matrix for a Coded Signal Processing Engine," filed Nov. 16, 2001; U.S. patent application Ser. No. 09/988,218, entitled "Interference Cancellation In a Signal," filed Nov. 19, 2001; U.S. patent application Ser. No. 09/988,219, entitled "A Method and Apparatus for Implementing Projections in Signal Processing Applications," filed Nov. 19, 2001; U.S. Provisional Patent Application No. 60/326,199, entitled "Interference Cancellation in a Signal," filed Oct. 2, 2001; U.S. Provisional Patent Application No. 60/325,215, entitled "An Apparatus for Implementing Projections in Signal Processing Applications," filed Sep. 28, 2001; U.S. Provisional Patent Application No. 60/251,432, entitled "Architecture for Acquiring, Tracking and Demodulating Pseudorandom Coded Signals in the Presence of Interference," filed Dec. 4, 2000; U.S. patent application Ser. No. 09/612,602, filed Jul. 7, 2000; and to U.S. patent application Ser. No. 09/137,183, filed Aug. 20, 1998. The entire disclosure and contents of these applications are hereby incorporated by reference.

BACKGROUND OF THE INVENTION

1. Field of the Invention

The present invention relates generally to a method and apparatus that enables the computation of the geolocation of a communication device, and particularly to the use of such a method and apparatus to compute the location of a mobile transmitter such as a mobile telephone (cell-phone) using either a handset-based or a network-based solution.

2. Description of the Prior Art

It is important to be able to geolocate a mobile telephone unit within a given service area both for security and for commercial reasons. As the number of wireless subscribers increase, an increasing number of emergency calls (911 calls) are expected to originate from mobile telephones. A study in the state of New Jersey indicated that about 43% of E-911 calls originated from mobile telephones ('State of New Jersey, Report on the New Jersey enhanced 911 system trial: The first 100 days', Jun. 16, 1997). Additionally, the Federal Communication Commission (FCC) has mandated that all mobile units should have a built-in location feature, such that mobile units are able to compute and transmit their location (to an accuracy of within 125 m) to a Public Safety Answering Point (PSAP) at least 67% of the time. This would facilitate emergency response to be dispatched to the site since the user may be incapacitated, or not be aware of their precise location. Besides emergency services, commercial applications involving location specific services such as advertising, location specific billing, fleet location monitoring, navigation, etc. are also envisioned in the near future.

The prior art for computing the location of a mobile telephone can be split into two broad categories; handset-based solutions and network-based solutions. Handset-based solutions are implemented such that the handset has the capability, using a Global Positioning System (GPS) or, alternatively, the time of arrival of signals (forward-link base station to mobile signals) from different base stations (at least 2 base stations are needed), the signal to noise ratio (SNR) of the signals, or a combination of GPS and time of arrival techniques, to ascertain its relative location with respect to the known, fixed locations of the Base Stations, and thereby its exact location, which it then can transmit to the network or to the PSAP.

There are significant drawbacks to using GPS because the use of a GPS involves additional hardware. Therefore, this handset-based discussion will focus on the use of a forward-link solution. In addition, GPS-alone solutions for mobile stations involve long acquisition times for the GPS signal and require a lot of power in the receiver of the mobile station. Server assisted GPS solutions overcome these limitations, but have poor reception deep inside buildings.

The basic principle of location computation, for a forward-link handset-based solution, is to receive signals from two or more base stations, and use the signal parameters (like SNR or times of arrival) to estimate the location of the handset from each of the base stations. Since the position of the base stations is known, knowledge of the relative position between the two or more fixed locations leads to an estimate of the location of the mobile station.

Network-based solutions involve two or more base stations simultaneously ascertaining the location of the mobile phone from which a location query has originated, relative to the base-stations, using the angle of arrival of the signals (a reverse-link mobile-to-base-station signal), the time(s) of arrival of the signals, or the signal-to-noise ratio of the signals actually received. The signal to noise ratios of these signals are compared to the pre-computed signal-to-noise ratios expected for different locations computed using drive test data. Thus, in a network based solution, two or more base stations receive the signal from the mobile station, i.e., on the reverse link, and those signal parameters (SNR, the time of arrival or the angle of arrival) are used by each base station to estimate the relative location of the mobile, and consequently, its actual location.

There are some deficiencies in each of the methods described above. Methods based on angle of arrival are susceptible to large errors when the base station and mobile station are close to one another; reflections of buildings can also cause huge changes in angles of arrival respect to the line of sight angle and induce errors. In addition, interference from 'strong' interfering sources may prevent adequate signal sources from being received and cause error in computation of location.

Given the importance of location determination, many approaches to computing the location of a mobile telephone exist in the patent literature. For example, U.S. Pat. No. 6,275,186, by Seung-Hyun Kong, teaches a solution where a dedicated searcher uses a combination of Signal-to-Interference ratios and times of arrival of the signal from a handset at multiple base stations to estimate its location. Both network- and handset-based solutions that depend on times of arrival and angle of arrival techniques share the problem that, in many environments, the three base stations needed to accurately locate the mobile transmitter are not 'seen' by the mobile transmitter because of the near-far problem. This happens because, on the forward link, the interference from a 'strong' base station contributes to the interference seen when the receiver is in the process of detecting and processing 'weaker' base stations.

In the case of network based solutions, interference from other mobile transmitters often prevents three base stations from being able to receive, detect and process the signal from a single mobile transmitter. This occurs because, in the reverse link between the mobile station and base station, especially for a base station that is not the serving base station for the mobile station in question, or for one that is not in handoff, the signals from the other mobiles sharing the bandwidth and being served by the base station cause interference in that base station's ability to detect and process the signal from the mobile station that needs the location service.

U.S. Pat. No. 6,263,208, by Chang et al., proposes a solution that uses a pre-computed probability map of pilot strengths for a given cellular area, and uses the actual received pilot strengths to estimate the location. They do not specifically address the issue of how a solution may be obtained if an adequate number of pilot signals are not visible to the mobile unit. Thus, there is no teaching of how to solve the problems of angle of arrival, reflections, and strong signals.

U.S. Pat. No. 6,163,696, by Qi Bi and Wen-Yi Kuo, proposes a network based solution where fake handoff messages are used, i.e., the mobile station increases its power until the primary base station and two or more other surrounding base stations are able to receive its signal. This solution, however, will cause increased interference to the signals from the other served mobiles in the area for the base stations in question. Thus, this solution compounds the strong signal problem.

U.S. Pat. No. 5,812,086 to Bertiger et al. proposes a central transceiver and a re-transmitter in order to service users within buildings. Such a system would be very costly and would not permit a user to use a communication device for geolocation purposes in a building that was not fitted with such a system.

The use of power control on the reverse and forward links is designed to limit interference and to ensure that the cellular network is balanced and at its optimal capacity. But even with the use of power control, say, when a mobile phone is very close to a particular base station, such interference is unavoidable because the strength of the signal from that base station contributes to the interference when the mobile phone is in the process of receiving, detecting and processing the signal from base stations 2 and 3, which may be further away. Similarly, in the case of the reverse link, since the serving base station attempts to ensure that all received signals from its mobiles are received with similar power levels and consequently, a nearby mobile station that is requesting location service would have a low transmit power of insufficient strength for two, or even one additional base station to receive this signal accurately enough for location computation. Two approaches exist in the prior art to tackle the near-far problem.

First, U.S. Pat. No. 6,157,842, by Karlsson et al., teach us that the near-far problem can be solved through the cessation of transmission by the strong base station for short intervals, during which time the mobile station can detect and process signals from weaker base stations, taking advantage of the lack of interference from the 'strong' base station. This approach has the disadvantage of potential disruption of communications for other served mobiles of the 'strong' base station. While this approach addresses the strong signal problem, it does not provide a viable solution. In addition, it does not address the angle of arrival or the reflection issues.

Second, U.S. Pat. No. 5,736,964, by Ghosh et al., teaches a solution that relies on the presence of backup emergency pilot generators that are used if a plurality of base stations is not visible. This is an expensive solution since it calls for the installation of equipment that only serves the purpose of location computation. While this approach addresses the strong signal problem, it may not provide a viable solution. In addition, it does not address the angle of arrival or the reflection issues.

Clearly, being able to receive multiple signal sources at a single transceiver, or, multiple transceivers being able to receive a single signal for a network-based solution, is critical to location determination. However, under real conditions, this is often not possible because of interference. The source of interference in spread spectrum systems is generated from the fact that all signal sources share the same bandwidth, all the time, and are simultaneously transmitting.

In spread spectrum systems, each transmitter may be assigned a unique code and in many instances each transmission from a transmitter is assigned a unique code. These codes may be used to spread the signal so that the resulting signal occupies some specified range of frequencies in the electromagnetic spectrum or the codes may be superimposed on another signal that might also be a coded signal. Assigning a unique code to each transmitter allows the receiver to distinguish between different transmitters.

If a single transmitter has to broadcast different message to different receivers, such as a base-station in a wireless communication system broadcasting to different mobiles, one may use codes to distinguish between the messages for each mobile unit. In this scenario, each bit for a particular user is encoded using the code assigned to that user. By coding in this manner, the receiver, by knowing its own code, may decipher the message intended for it from the composite signal transmitted by the transmitter. In some instances, such as in a coded radar system, each pulse is assigned a unique code so that the receiver is able to distinguish between the different pulses based on the codes.

The key idea in all of these coded systems is that the receiver knows the codes of the message intended for it and, by correctly applying the codes, the receiver may extract the message intended for it. However, such receivers are more complex than receivers that distinguish between messages by time and/or frequency alone. The complexity arises because the signal received by the receiver is a linear combination of all the coded signals present in the spectrum of interest at any given time. The receiver has to be able to extract the message intended of it from this linear combination of coded signals.

The following section presents the problem of interference in linear algebraic terms followed by a discussion of the current, generic (baseline) receivers.

Let H be a vector containing the spread signal from source no. 1 and let $\theta_1$ be the amplitude of the signal from this source. Let $s_i$ be the spread signals for the remaining sources and let $\phi_i$ be the corresponding amplitudes. Suppose the receiver is interested in source number 1, the signals from the other sources may be considered to be interference. Then, the received signal is:

$$y = H\theta_1 + s_2\phi_2 + s_3\phi_3 + \ldots + s_p\phi_p + n \quad (1)$$

where n is the additive noise term, and p is the number of sources in the Code-Division Multiple Access (CDMA)

system. Let the length of the vector y be N, where N is the number of points in the integration window. This number N is selected as part of the design process as part of the trade-off between processing gain and complexity. A window of N points of y will be referred to as a segment.

In a wireless communication system, the columns of the matrix H represent the various coded signals and the elements of the vector θ are the powers of the coded signals. For example, in the base-station to mobile link of a CDMA system, the coded signals might be the various channels (pilot, paging, synchronization and traffic) and all their various multi-path copies from different base-stations. In the mobile- to base-station link, the columns of the matrix H might be the coded signals from the mobiles and their various multi-path copies.

Equation (1) may now be written in the following matrix form:

$$y = H\theta + S\phi + n \qquad (2)$$

$$= [HS]\begin{bmatrix} \theta \\ \phi \end{bmatrix} + n$$

where

H: spread signal matrix of the source that the receiver is demodulating
S=[$s_2 \ldots s_p$]: spread signal matrix of all the other sources, i.e., the interference
φ=[$\phi_2 \ldots \phi_p$]: interference amplitude vector Receivers that are currently in use correlate the measurement, y, with a replica of H to determine if H is present in the measurement. If H is detected, then the receiver knows the bit-stream transmitted by source number 1. Mathematically, this correlation operation is:

$$\text{correlation function} = (H^T H)^{-1} H^T y \qquad (3)$$

where $^T$ is the transpose operation.

Substituting for y from equation (2) illustrates the source of the power control requirement:

$$(H^T H)^{-1} H^T y = (H^T H)^{-1} H^T (H\theta + S\phi + n) \qquad (4)$$

$$= (H^T H)^{-1} H^T H\theta + (H^T H)^{-1} H^T S\phi + (H^T H)^{-1} H^T n$$

$$= \theta + (H^T H)^{-1} H^T S\phi + (H^T H)^{-1} H^T n$$

It is the middle term, $(H^T H)^{-1} H^T S\phi$, in the above equation that results in the near-far problem. If the codes are orthogonal, then this term reduces to zero, which implies that the receiver has to detect θ in the presence of noise (which is $(H^T H)^{-1} H^T n$) only. It is easy to see that, as the amplitude of the other sources increases, the term $(H^T H)^{-1} H^T S\phi$ contributes a significant amount to the correlation function, which makes the detection of θ more difficult.

The normalized correlation function, $(H^T H)^{-1} H^T$, defined above, is in fact the matched filter and is based on an orthogonal projection of y onto the space spanned by H. When H and S are not orthogonal to each other, there is leakage of the components of S into the orthogonal projection of y onto H. This leakage is geometrically illustrated in FIG. 1.

While the near-far problem has various implications on capacity of communication networks in terms of the interference limiting the number of users, say, on the forward and reverse link of a CDMA system, it is our intent here to focus on the solution to the near-far problem that hinders the ability to precisely identify the location of a mobile transmitter.

Thus, there is a need for an apparatus and method that facilitates either a mobile station being able to receive, detect and process signals from multiple base stations or multiple base stations being able to receive, detect and process signals from a single mobile station, to facilitate the ability of the mobile station or the network to precisely calculate the location of the mobile station in question. Preferably, this solution would function under conditions when interference from a 'strong' base station prevents the mobile station from 'seeing' weaker base stations, and on the reverse link, when interference from many 'strong' mobiles prevents the base stations from 'seeing' the mobile station that requires location service.

SUMMARY OF THE INVENTION

It is therefore an object of the present invention to provide a method and apparatus for geolocaton which will allow gelolocation of weak signals.

It is a further object to provide a method and apparatus for geolocation that utilizes the orthogonal projection of a signal to cancel interference associated with that signal.

According to a first broad aspect of the present invention, there is provided a method for determining geolocation of a mobile transmitter, the method comprising the steps of: generating a location request; detecting a first source signal (y1); generating an orthogonal projection of the first source signal; canceling interference from the first source signal by utilizing the orthogonal projection; detecting at least one more source signal (y2 . . . yn); and utilizing the source signals to determine the location of the mobile.

According to a second broad aspect of the invention, there is provided an apparatus for determining geolocation of a mobile, the apparatus comprising: means for generating a location request; means for detecting a first source signal (y1); means for generating an orthogonal projection of the first source signal; means for canceling interference from the first source signal by utilizing the orthogonal projection; means for detecting at least one more source signal (y2 . . . yn); and means for utilizing the source signals to determine the location of the mobile transmitter.

According to a third broad aspect of the invention, there is provided a method for improving the signal to noise ratio of a source signal by adjusting the correlation length of the source signal, the method comprising the steps of: (A) assigning a first pre determined correlation length to a variable N; (B) increasing the correlation length N by an amount Y; (C) determining the signal to noise ratio of the source signal; (D) comparing the signal to noise ratio to a predetermined threshold to determine if the signal to noise ratio is equal to or above the threshold, if below the threshold, then initiating step E otherwise, initiating step F; (E) comparing the correlation length to a predetermined maximum correlation length and if below the maximum correlation length, returning to step B, otherwise going to step F; and (F) transmitting the source signal for further processing.

According to a fourth broad aspect of the invention, there is provided an apparatus for improving the signal to noise ratio of a source signal by adjusting the correlation length of the source signal, the apparatus comprising: a means for assigning first pre determined correlation length to a variable N; a means for increasing the correlation length N by an amount Y; a means determining the signal to noise ratio of the source signal; and a means for comparing the signal to noise ratio to a predetermined threshold to determine if the signal to noise ratio is equal to or above the threshold, if below the threshold, then initiating a comparing means, otherwise, initiating a transmitting means; wherein the comparing means compares the correlation length to a predetermined maximum correlation length and if below the maximum correlation length, returning to the means for increasing the correlation length, otherwise initiating the transmitting means; and the transmitting means for transmitting the source signal for further processing.

According to a fifth broad aspect of the invention, there is provided a method for determining geolocation of a mobile transmitter, the method comprising the steps of: (A) generating a location request; (B) detecting a first source signal (y1); (C) assigning a first pre determined correlation length to a variable N; (D) increasing the correlation length N by an amount Y; (E) determining the signal to noise ratio of the first source signal (y1); (F) comparing the signal to noise ratio to a predetermined threshold to determine if the signal to noise ratio is equal to or above the threshold, if below the threshold, then initiating step G otherwise, initiating step H; (G) comparing the correlation length to a predetermined maximum correlation length and if below the maximum correlation length, returning to step D, otherwise going to step H; (H) generating an orthogonal projection of the first source signal; (I) canceling interference from the first source signal by utilizing the orthogonal projection; (J) detecting at least one more source signal (y2 . . . yn); and (K) utilizing the source signals to determine the location of the mobile.

According to a sixth broad aspect of the invention, there is provided a method for determining geolocation of a mobile transmitter, the method comprising the steps of: (A) generating a location request; (B) detecting a first source signal (y1) at a first base station; (C) generating an orthogonal projection of the first source signal; (D) canceling interference from the first source signal by utilizing the orthogonal projection; (E) detecting the first signal source (y1) at least one more base station; and (F) utilizing timing information of the source signal to determine the location of the mobile.

According to a sixth broad aspect of the invention, there is provided an apparatus for determining geolocation of a mobile transmitter, the apparatus comprising: means for generating a location request; means for detecting a first source signal (y1) at a first base station; means for generating an orthogonal projection of the first source signal; means for canceling interference from the first source signal by utilizing the orthogonal projection; means for detecting the first signal source (y1) at least one more base station; and means for utilizing timing information of the source signal to determine the location of the mobile.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Figure 1:
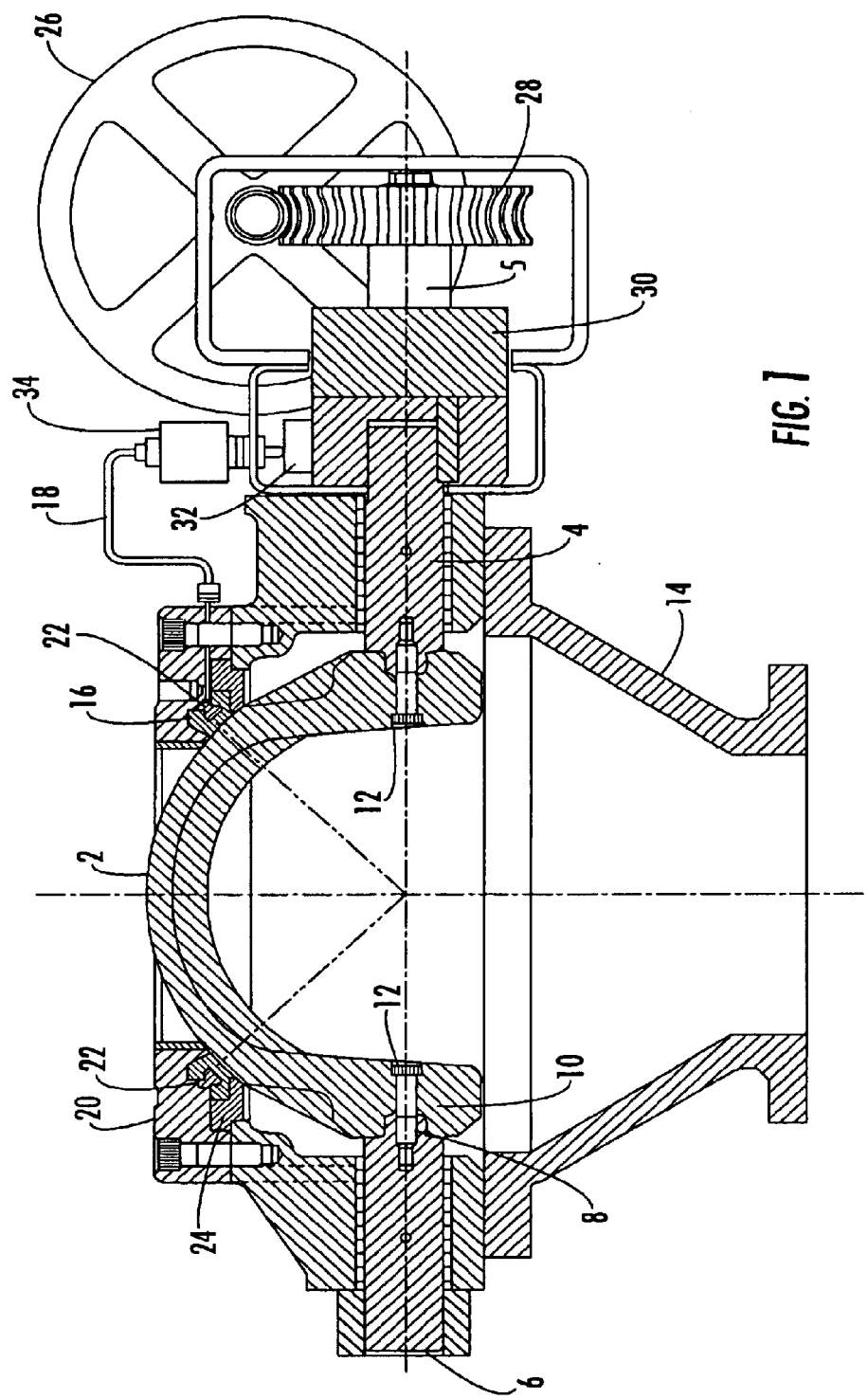
FIG. 1 is a diagram showing interference caused by cross-correlations in a prior art CDMA system.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "analog" refers to any measurable quantity that is continuous in nature.

For the purposes of the present invention, the term "base station" refers to a transmitter and/or receiver that communicate(s) with multiple mobile- or stationary units in a cellular environment.

For the purposes of the present invention, the term "baseline receiver" refers to a receiver against which a receiver of the present invention is compared.

For the purposes of the present invention, the terms "basis" and "basis vector" refer to a set of vectors that completely span the space under consideration. In 3-D space, any three linearly independent vectors comprise a basis for the 3-D space, and for 2-D space, any 2 vectors that are linearly independent comprise a "basis."

For the purposes of the present invention, the term "bit" refers to the conventional meaning of "bit," i.e., a fundamental unit of information having one of two possible values, a binary 1 or 0, or in bipolar binary terms, a −1 or a +1.

For the purposes of the present invention the term "Code-Division Multiple Access (CDMA)" refers to a method for multiple access in which all users share the same spectrum but are distinguishable from each other by a unique code.

For the purposes of the present invention, the term "chip" refers to a non-information bearing unit that is smaller than a bit, the fundamental information bearing unit. For example, one bit is composed of multiple chips in an application that employs spreading. Depending on the amount of the spreading factor, a fixed length sequence of chips constitutes a bit.

For the purposes of the present invention, the term "code offset" refers to a location within a code. For example, base stations in certain cellular environments distinguish between each other by their location within a particular pseudorandom code.

For the purposes of the present invention, the term "correlation" refers to the inner product between two signals scaled by the length of the signals. Correlation provides a measure of how alike two signals are.

For the purposes of the present invention, the terms "decomposition" and "factorization" refer to any method used in simplifying a given matrix to an equivalent representation.

For the purposes of the present invention, the term "digital" refers to the conventional meaning of the term digital, i.e., relating to a measurable quantity that is discrete in nature.

For the purposes of the present invention, the term "doppler" refers to the conventional meaning of the term doppler, i.e., a shift in frequency that occurs due to movement in a receiver or transmitter and/or the background.

For the purposes of the present invention, the term "Global Positioning System (GPS)" refers to the conventional meaning of these terms, i.e., a satellite-based system for position location.

For the purposes of the present invention, the product STS where S is a matrix, is called the "Grammian" of S.

For the purposes of the present invention, the term "in-phase" refers to the component of a signal that is aligned in phase with a particular signal, such as a reference signal.

For the purposes of the present invention, the term "quadrature" refers to the component of a signal that is 90 degrees out of phase with a particular signal, such as a reference signal.

For the purpose of the present invention, the term "interference" refers to the conventional meaning of the term interference, i.e., a signal that is not of interest, but which interferes with the ability to acquire, identify, detect, track or perform any other operation on the signal of interest. Interference is typically structured noise that is created by other processes that are trying to do the same thing.

For the purposes of the present invention, the term "linear combination" refers to the combining of multiple signals or mathematical quantities in an additive way, where each signal is multiplied by some non-zero scalar and all the resultant quantities so obtained summed together.

For the purposes of the present invention, a vector is "linearly dependent" with respect to a set of vectors if it can be expressed as an algebraic sum of any of the set of vectors.

For the purposes of the present invention, the term "matched filter" refers to a filter that is designed to facilitate the detection of a known signal by effectively correlating the received signal with an uncorrupted replica of the known signal.

For the purposes of the present invention, the term "noise" refers to the conventional meaning of noise with respect to the transmission and reception of signals, i.e., a random disturbance that interferes with the ability to detect a signal of interest, say, for example, the operation of a nearby electrical device. Additive "noise" adds linearly with the power of the signal of interest. Examples of noise can include automobile ignitions, power lines and microwave links.

For the purpose of the present invention, the term "matrix inverse" refers to the inverse of a square matrix S, denoted by $S^{-1}$, that is defined as that matrix which when multiplied by the original matrix equals the identity matrix, I, i.e., $SS^{-1}=S^{-1}S=I$, a matrix which is all zero save for a diagonal of all ones.

For the purposes of the present invention, the term "mobile" refers to a mobile phone which functions as a transmitter/receiver pair that communicates with a base station.

For the purposes of the present invention, the term "modulation" refers to imparting information on another signal, such as a sinusoidal signal or a pseudorandom coded signal, typically accomplished by manipulating signal parameters, such as phase, amplitude, frequency or some combination of these quantities.

For the purposes of the present invention, the term "multipath" refers to copies of a signal that travel a different path to the receiver.

For the purposes of the present invention, the term "norm" refers to a measure of the magnitude of a vector. The "2-norm" of a vector refers to its distance from the origin.

For the purposes of the present invention, the term "normalization" refers to a scaling relative to another quantity.

For the purposes of the present invention, two nonzero vectors, $e_1$ and $e_2$ are said to be "orthogonal" if their inner product (defined as $e_1^T e_2$, where T refers to the transpose operator) is identically zero. Geometrically, this refers to vectors that are perpendicular to each other.

For the purposes of the present invention, any two vectors are said to be "orthonormal" if, in addition to being orthogonal, each of their norms are unity. Geometrically, this refers to two vectors that, in addition to lying perpendicular to each other, are each of unit length.

For the purposes of the present invention, the term "processing gain" refers to the ratio of signal to noise ratio (SNR) of the processed signal to the SNR of the unprocessed signal.

For the purposes of the present invention, the term "projection", with respect to any two vectors x and y, refers to the projection of the vector x onto y in the direction of y with a length equal to that of the component of x, which lies in the y direction.

For the purposes of the present invention, the term "pseudorandom number (PN)" refers to sequences that are typically used in spread spectrum applications to distinguish between users while spreading the signal in the frequency domain.

For the purposes of the present invention, the term "rake receiver" refers to a method for combining multipath signals in order to increase the processing gain.

For the purposes of the present invention the term "signal to noise ratio (SNR)" refers to the conventional meaning of signal to noise ratio, i.e. the ratio of the signal to noise (and interference).

For the purposes of the present invention, the term "singular matrix" refers to a matrix for which the inverse does not exist. In a "singular matrix," one of its rows or columns is not linearly independent of the rest, and the matrix has a zero determinant.

For the purposes of the present invention, the term "spread spectrum" refers to techniques that use spreading codes to increase the bandwidth of a signal for more effective use of bandwidth, while also being resistant to frequency-selective fading.

For the purposes of the present invention, the term "spreading code" refers to a code used in communication systems to modify the bit being transmitted in a spread spectrum system, e.g. the CDMA Pseudorandom (PN) codes used in the short and long codes. Examples of spreading codes include Gold, Barker and Walsh codes.

For the purposes of the present invention, the term "steering vector" refers to a vector that contains the phase history of a signal that is used in order to focus the signal of interest.

For the purposes of the present invention, the term "symbol" refers to the fundamental information-bearing unit transmitted over a channel in a modulation scheme. A symbol may be composed of one or more bits, which can be recovered through demodulation.

For the purposes of the present invention, the term "transpose" refers to a mathematical operation in which a matrix is formed by interchanging rows and columns of another matrix. For example, the first row becomes the first column; the second row becomes the second column, and so on.

Description

In the following detailed description, reference is made to the accompanying drawings that form a part hereof, and in which are shown, by way of illustration, specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the invention. The following detailed description is, therefore, not to be taken in a limiting sense.

The present invention provides a method and apparatus for determining the position of a mobile station in a spread spectrum environment. The present invention was developed in the context of a wireless communications application. However, the application of the present invention is not limited merely to communications applications and has broader uses in any environment where there is interference from coded signals.

When determining the position of a mobile station in a spread spectrum environment, it may not possible for a mobile phone to detect and process signals from a plurality of base stations (in the case of the forward link) and it is often not possible for a plurality of base stations to detect and process the signal from a single mobile station (in the case of a reverse link), and thereby hampering the process of accurately being able to locate the position of the mobile station.

For a handset based solution, the pilot signals from at least two base stations (in the case of the forward link) must be detected and processed for a location solution to be obtained, and it is preferable that three or more be used for an accurate location solution because of uncertainties induced by multipaths problems. Similarly, for a network based solution, at least two base stations must be able to detect and accurately process a signal from the mobile station in order to be able to calculate its location, and again, because of uncertainties due to multi-path, it is preferable that three or more base stations be used in order to arrive at an accurate solution for the location of the mobile station.

Figure 2:
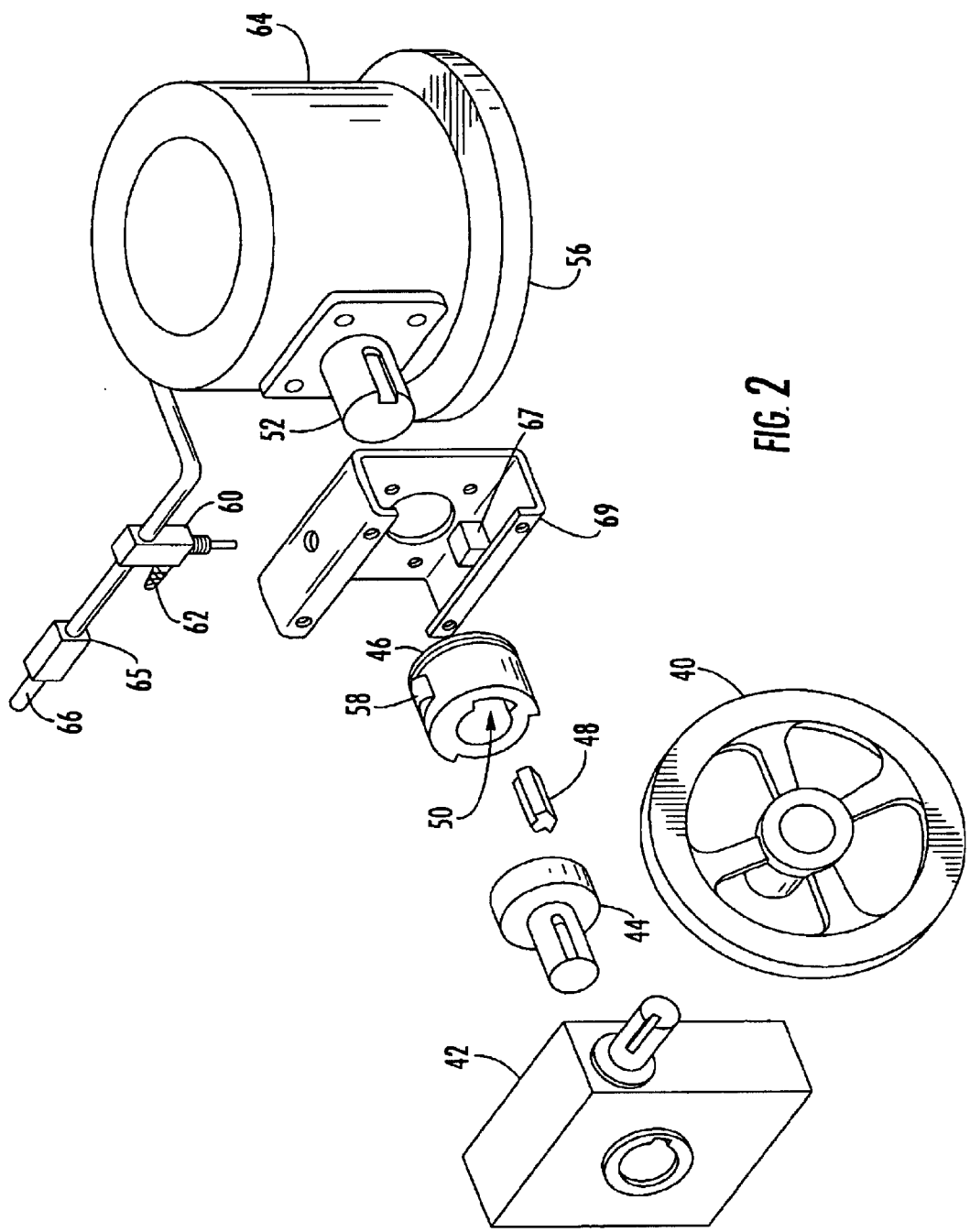
FIG. 2 illustrates a typical scenario in the cellular network where the invention, constructed in accordance with a preferred embodiment, may be utilized.

FIG. 2 illustrates a typical scenario in which the invention may be utilized. In this figure, Mobile Station 1 (MS1) is very close to Base Station 1 (BS1), and thus interference from BS1 prevents MS1 from receiving and detecting signals from Base Stations 2 and 3, preventing the mobile station from being able to calculate its position. For a reverse link network based location calculation, the low transmit power of MS1 would prevent the signal from MS1 from being detected by BS2 and BS3.

The present invention is an improved receiver that makes use of the principle of orthogonal projections as described in numerous prior patent applications, from the present inventors, that have been incorporated by reference.

In this invention, the teachings of the earlier inventions, referred to as the Coded Signal Processing Engine (CSPE), are applied for the purpose of removing any interference from other signal sources that hinder the ability to detect and process the desired signal. CSPE removes interference signals by projecting the given composite signal in a space perpendicular to that spanned by the interference, in order to detect and process the desired signal with an improved signal-to-noise ratio, compared to a baseline receiver where the signal is processed as received. A plurality of signals may be processed and the location of the mobile phone thus may be accurately determined. For a detailed discussion of this concept, the reader is referred to U.S. patent application Ser. No. 09/988,218, entitled "Interference Cancellation In a Signal," filed Nov. 19, 2001, and U.S. patent application Ser. No. 09/988,219, entitled "A Method and Apparatus for Implementing Projections in Signal Processing Applications," filed Nov. 19, 2001. Both of these applications are hereby incorporated by reference.

The CSPE mitigates the interference by removing the interfering signal from the measurement signal, y, by means of a projection operation. Mathematically, a projection onto the space spanned by the columns of the interference matrix S is given by:

$$P_s = S(S^T S)^{-1} S^T$$

A projection onto the space perpendicular to the space spanned by the columns of S is obtained by subtracting the above projection $P_s$ from the identity matrix (a matrix with ones on the diagonal and zeros everywhere else). Mathematically, this projection is:

$$P_s^\perp = I - P_s = I - S(S^T S)^{-1} S^T$$

The projection matrix $P_s^\perp$ has the property that when it is applied to a signal of the type $S\phi$ (this is a signal that lies in the space spanned by the columns of S), it completely removes $S\phi$ no matter what the value of $\phi$. This cancellation is illustrated below:

$$P_s^\perp(S\phi) = (I - S(S^T S)^{-1} S^T) S\phi = S\phi - S(S^T S)^{-1} S^T S\phi = S\phi - S\phi = 0$$

When applied to the measurement signal y, it cancels the interference terms $$P_s^\perp y = P_s^\perp(H\theta + S\phi + n) = P_s^{\perp}H\theta + P_s^\perp S\phi + P_s^\perp n = P_s^\perp H\theta + P_s^\perp n$$

The many details of the implementation are discussed in U.S. patent application Ser. No. 09/988,218, entitled "Interference Cancellation In a Signal," filed Nov. 19, 2001; U.S. patent application Ser. No. 09/988,219, entitled "A Method and Apparatus for Implementing Projections in Signal Processing Applications," filed Nov. 19, 2001; and will not be discussed here.

Figure 3:
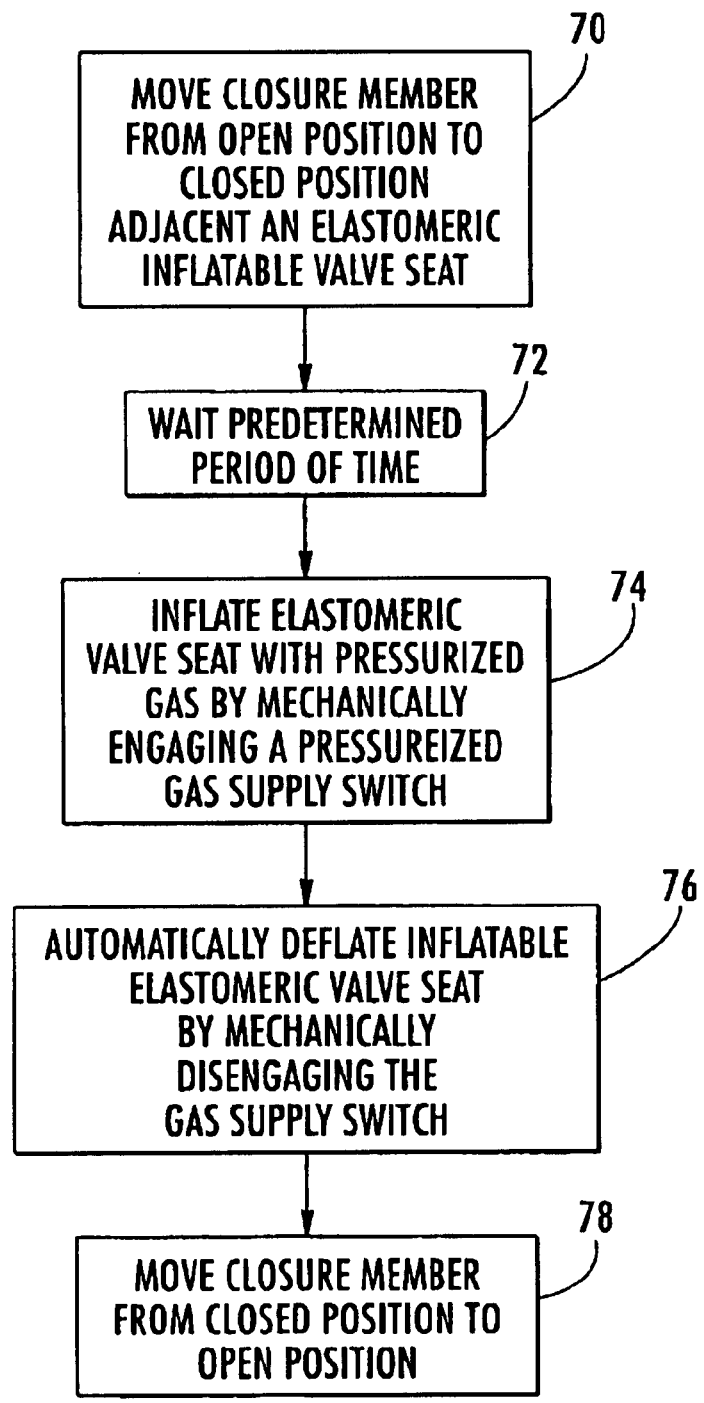
FIG. 3 illustrates a sample CSPE architecture constructing in accordance with the teachings of the present invention.

FIG. 3 illustrates the CSPE in operation. Details of the architecture for cancellation are discussed in a U.S. Provisional Patent Application No. 60/326,199 entitled "Interference Cancellation in a Signal," filed Oct. 2, 2001 and U.S. Provisional Patent Application No. 60/251,432, entitled "Architecture for Acquiring, Tracking and Demodulating Pseudorandom Coded Signals in the Presence of Interference," filed Dec. 4, 2000. An efficient manner in which the $P_s^\perp$ may be computed and applied is described in U.S. Provisional Patent Application No. 60/325,215, entitled "An Apparatus for Implementing Projections in Signal Processing Applications," filed Sep. 28, 2001. Different ways of constructing the S matrix are described in U.S. patent application entitled "Construction of an Interference Matrix for a Coded Signal Processing Engine," filed Nov. 16, 2001. The entire disclosure and contents of these applications are hereby incorporated by reference.

In the architecture presented, the single data processing channel consists of multiple fingers 300, 300' and 300"

where each finger consists of a code generation module 302, 302' and 302" (for building the S matrix); $P_S^\perp$ modules 304, 304' and 304"; an acquisition module 310, 310', and 310" and a tracking module 312, 312' and 312". The tracking module, of course, consists of FLLs 322, 322' and 322"; PLLs 320, 320' and 320"; as well as DLLs 318, 318' and 318". Each processing finger 300, 300' and 300" within a channel has the function of acquiring and tracking a distinct multipath signal from the same source.

In order to understand how the architecture depicted in FIG. 3 works, the starting assumption may be used that this channel has just been assigned to track the signals from a particular source and that the system is already in the process of acquiring and tracking other sources or sources.

The input data to this channel arrives in the form of a digital data stream. Since there are other sources being tracked, the replicate code generator module 302, 302' and 302" would generate the appropriate S matrix and this matrix is used to create $P_S^\perp$ 304, 304' and 304". In this case, the digital data stream y is provided as input into the $P_S^\perp$ module. The output of this module 304 is fed into the acquisition module 310 in the same finger.

In case the system was not tracking any other sources, then there would be no S matrix generated and therefore no $P_S^\perp$ function. In this case, the input digital data stream is passed directly into the acquisition stage.

The acquisition stage acquires the signal and all its multipath copies from the source of interest. If the acquisition stage identifies more than one multipath, then multiple tracking sections are used for each multipath signal individually. The outputs of the tracking stages 312, 312' and/or 312" are the code, phase, and Doppler offsets that are used to build the S in the other channels. Furthermore, if all the available processing tracks are consumed, there is no need to mitigate any co-channel interference.

Now suppose that due to co-channel interference, the acquisition stage 310, 310' or 310" was only able to acquire fewer multipaths than there are available processing fingers, i.e., the other multipath signals are buried in the co-channel interference. In that case, the information from the acquisition stage is used to track the first signals identified. The information about the code, phase and Doppler offsets of the first signals being tracked are obtained from the tracking system 312, 312' and/or 312" and are provided as input into the replicate code generators modules 302' and 302" in the same channel.

The S matrix built in this finger now has included in it the code of the lone signal being processed in the finger 300. As a result, the finger 300' will eliminate interference from all the other sources as well as the dominant signal from the source of interest. The acquisition module 310' in this finger then acquires the multipath signal which is now visible because the interference from the dominant signal has been eliminated. That multipath is then tracked in 312' and the tracking information is provided to both the finger 300 (to improve its ability to track the dominant signal) as well as to the other fingers, e.g., 300" to aid in finding additional weak multipath signals. The tracking information from all these modules are used to perform the Rake operation 330 for data demodulation.

Now that we have described a physical implementation, we will turn to a broader discussion of the use of this physical implementation. Receivers for interference cancellation using orthogonal projection methods could be one of the four categories broadly described below.

Serial Canceller

This version of cancellers refers to a family of receivers that receives (acquires and tracks a signal, say Signal 1, then uses $P_S^\perp$ to cancel Signal 1 by projecting out from the main signal that portion that lies in the direction of Signal 1, and then proceeds to receive (acquire/track/demodulate) signal 2 that may be either buried and therefore not visible in the main signal, or was of very weak strength. This process could continue where signal 2 is now projected out (with a modified projection operator) in order to receive further signals. The process terminates when:

a) all desired signals are being received; or
b) no further signal can be received because of very low signal energy (because successive cancellations cause a loss of signal energy)

Parallel Canceller

In this family of receivers, all projection operations and cancellations are performed on the received signal, even though strong signals are acquired and tracked first. Appropriate delays are used to align the interfering vectors that make up the interference matrix, S, properly with the symbol of interest.

Hybrid Cancellers

These use a combination of serial and parallel architectures, for example, using serial cancellers to project out the interference from the strongly interfering signals, and then using parallel cancellers to operate on the residual signal in order to look for buried and weaker signals.

Multistage Canceller

This is a variant of the parallel canceller, but importantly, is used in a performance enhancing mode rather than one of receiving weaker and buried signals. In this family of receivers, all signals are received and these estimates are used to project out interference from the raw signal, and receive the signals of interest again, but with an improved quality (lower Bit Error Rate (BER)). A receiver of this type could be used in a network-based solution since the computational load of this canceller is high and may not be feasible on a handset.

The use of the CSPE in location determination varies slightly for handset-based, network-based and hybrid implementations.

Handset-Based Forward Link Solution

The Advanced Forward Link Triangulation (AFLT) technique is one of the more commonly used solutions in a forward link system for geolocation. For a detailed discussion of the AFLT technique and other geolocation techniques, the reader is referred to "Wireless location in CDMA cellular radio systems," James J. Caffery Jr., Kluver Academic, Boston, 2000. This text is hereby incorporated by reference. It should be appreciated that the present invention is not limited to the use of AFLT for geolocation and that other known geolocation methods may be utilized and are considered within the scope of the present invention.

First, the method of the present invention is generally described. Then, the specific steps in accomplishing the invention are discussed. The handset, upon initiation of the location procedure, checks to see how many independent base station pilots are visible. For example, it uses the PN offsets found in the neighbor list and in the active set to assign those codes to the rake receivers, which attempt to receive the different signals, differentiated by their offsets.

Since only the time(s) of arrival of the signals from different sources are important for the location computation, and not any specific message, the focus of this discussion will be on acquiring and tracking pilot signals. For the purposes of this invention, and in general, for calculating the location of a mobile, the objective is to obtain an adequately high signal-to-noise ratio in the correlation of at least two, and preferably, three pilot signals from different base station. It should be appreciated that other signals may be utilized and that the use of the pilot signal is merely exemplary of the inventive concept.

If an adequate number of signal sources are detected, and their timing is acquired to the required precision, then that information alone is transmitted to the location-calculating module, which is sufficient to compute its location. This invention is particularly useful in situations where the adequate numbers of pilots are not 'visible' to the baseline receiver, or are detected at very low signal strengths. Under such circumstances, one finger of the receiver assigned to the strongest known pilot(s), and the information thus obtained about the known signal source(s) is used to produce interference matrices and the interference from the known signal source(s) is removed from the received signal to produce an interference-removed signal, which is then assigned to the other fingers via the searcher to detect 'weaker' pilot(s).

In the case of very strong interference because of the existence of many multi-paths of a strong interfering signal source and a limited number of fingers to receive and detect each multi-path, the additional pilot(s) that are needed for a location computation cannot be detected for want of fingers. Under these conditions, the handset continuously detects the strong interfering signal, and uses this information to cancel the interference from this signal and detect the two additional sources, one at a time, by the following steps:

a) Cancel interference from signal source 1 to detect source 2 and determine its parameters;

b) Store the necessary timing and/or location information about source 2;

c) Now, continue to cancel interference from signal source 1, but look for source 3 and detect its parameters;

d) Location computation can now be done using information about source 1, pre-computed information of source 2, and information about source 3.

Figure 4:
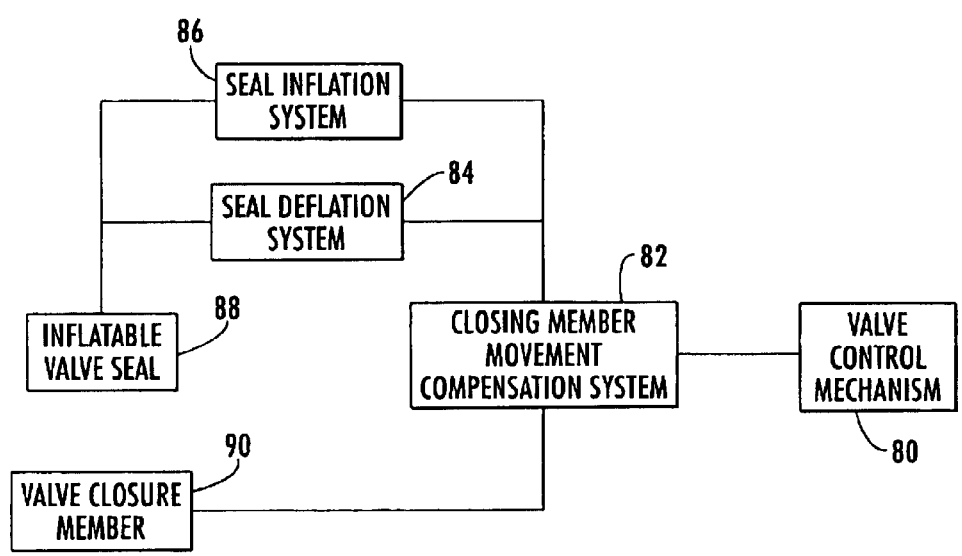
FIG. 4 is a flowchart illustrating the steps associated with the method of the present invention in use in a receiver constructed in accordance with a preferred embodiment of the invention.

Now a more detailed description of the method 400 of the present invention will be provided. FIG. 4 is a flowchart that depicts a method 400 that is used to implement the invention for a forward-link handset based solution. This illustrates an essential feature of this invention, which is to use the principle of orthogonal projections, as implemented by the Coded Signal Processing Engine to process the incoming signal, and reduce or cancel the interference from 'stronger' sources in order to receive, detect and process the signal from 'weaker' sources such that the total number of sources needed to locate the mobile station are detected. One may see that this invention is not limited merely to location solutions that depend on time differences of arrival, but also to other techniques that depend on being able to detect multiple sources, for example, angle of arrival techniques. Other examples of techniques include, but are not limited to: SNR difference or arrival and frequency difference of arrival.

As may be seen in FIG. 4, a location request 402 is initiated by a user, by the network, or by a third party. The receiver determines if a first signal source may be detected. This is illustrated by decision diamond 404. If the first signal source is not detected, then a failure report is generated as illustrated by block 406. Otherwise, the first signal source is detected. The detection of the source may be by means of the searcher that is currently used in the art for the blind acquisition of pilot signals, or by means of a dedicated position location searcher. The essential feature of these detectors, referred to as acquisition modules is to correlate the incoming signal with different phase offsets of the PN short codes used to distinguish one signal source from another, in the case of the forward link, and with different long code phase offsets in the case of the reverse link.

The next step is to detect a second signal source. This is illustrated by decision diamond 408. If the second signal source is not detected, then the CSPE is invoked to cancel the first signal source so that weaker signals may be detected. This is represented by block 410. Detecting step 408 is repeated. If during the second detection the second signal source is not detected, then a failure report is generated as illustrated by block 410. Otherwise, the next step is to detect a third signal source. This is illustrated by decision diamond 412. If the third signal source is not detected, then the CSPE is invoked to cancel the first and or second signal sources so that weaker signals may be detected. This is represented by block 414. Detecting step 412 is repeated. It should be appreciated that it is not necessary to utilize three signal sources for location. The use of merely two sources may provide an accurate enough location. Thus, the use of three or more sources is a matter of achieving particular design accuracy. Steps 412 and 414 may be repeated for other sources to increase accuracy if desired for other signal sources.

After detecting three signals from three different sources, and their time delay(s) of arrival, the information is passed on to the location calculating procedure. This step is illustrated by block 416. Next, a determination is made to see if the signal parameter information is accurate enough. This is represented by decision diamond 418. If the information is accurate, then the signal source parameters are utilized to calculate location as indicated by block 420. Finally, the location information is transmitted as is illustrated in step 422. This transmission may be to memory, to a display, to a base station or to a third party, depending on the particular hardware implementation.

If the information is not accurate enough, then another attempt is made to detect the second signal source as illustrated by diamond 408.

Network-Based Reverse Link Solution

Each base station receiver simultaneously receives and processes signals from multiple mobile stations. When the network receives a message about a location request, multiple base stations attempt to detect the signal from the mobile station. The network uses information about the mobile phone's signal and handoff information to determine which base stations would be able to detect the mobile phone. If two or more base stations can detect the signal, a location computation may be made. In cases where base station(s) cannot receive a given mobile's signal, and interference from the other mobiles served by the base station(s) are causing this interference, this invention may be utilized such that, those base station(s) that need to detect the mobile's signal cancel the interference produced by the other reverse link channels, and then attempt to detect the mobile phone in question.

Figure 7:
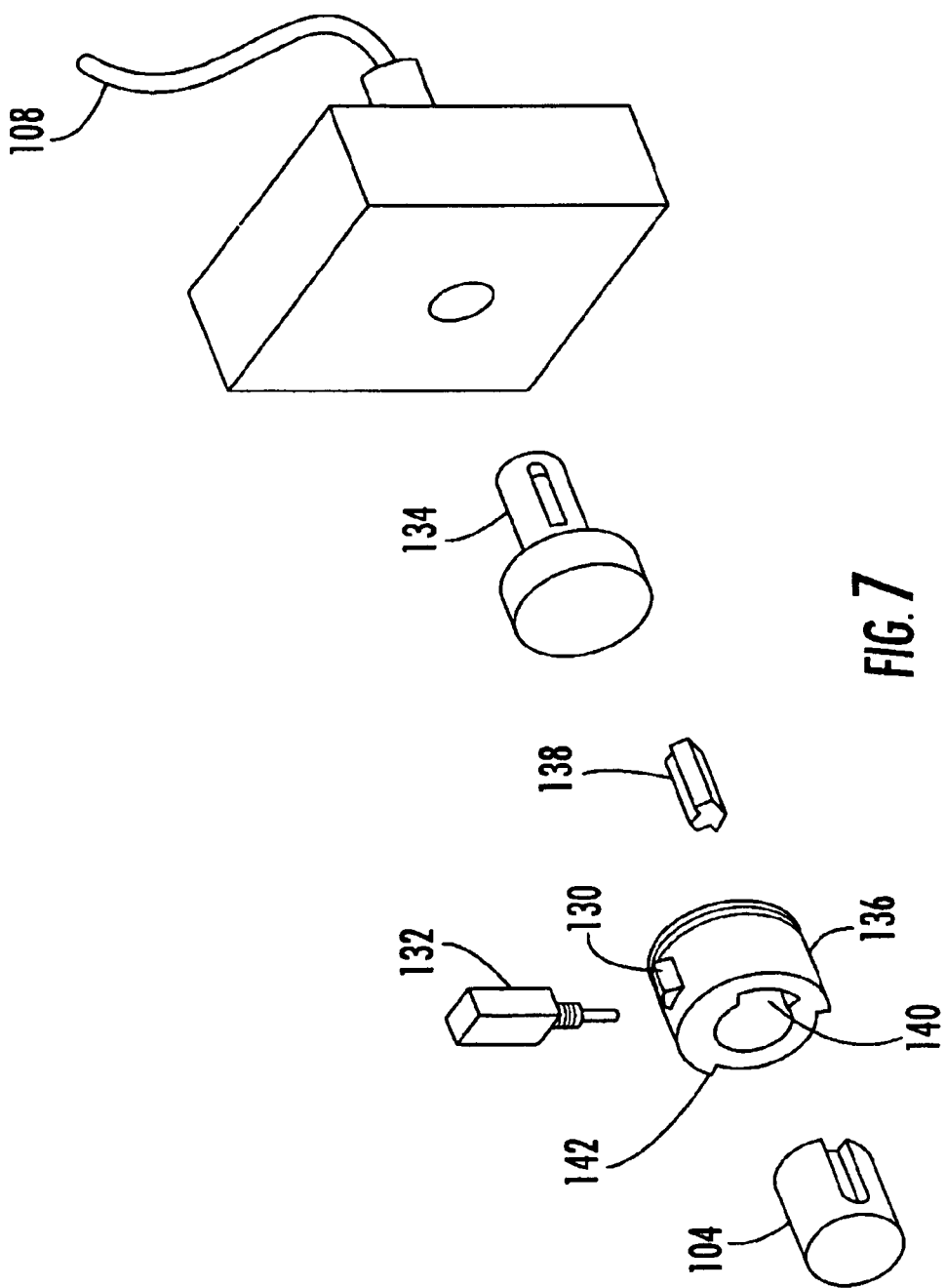
FIG. 7 is a flowchart illustrating the steps associated the method of the present invention in use in a network-based solution, at the base station receiver.
Figure 1:
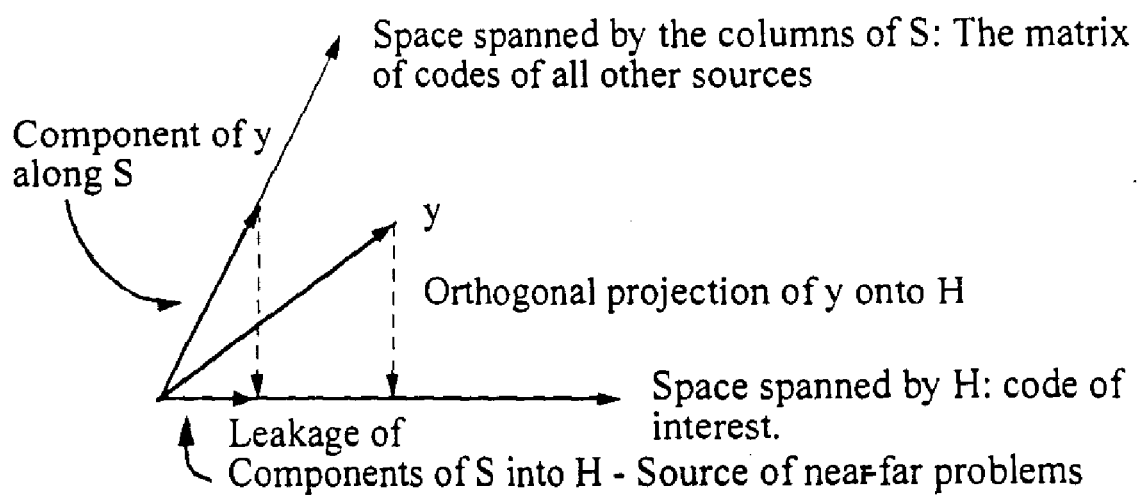
Figure 2:
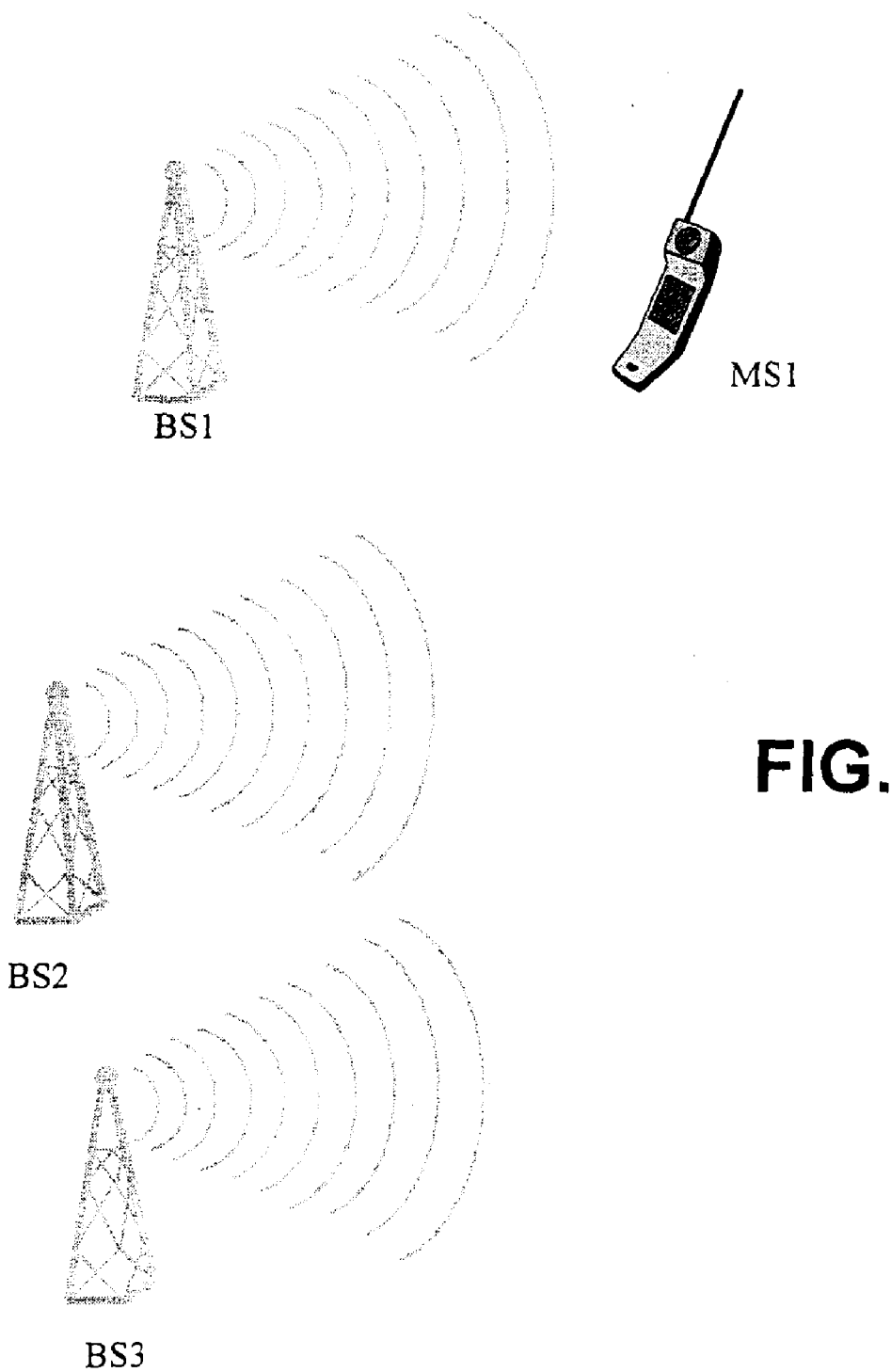
Figure 3:
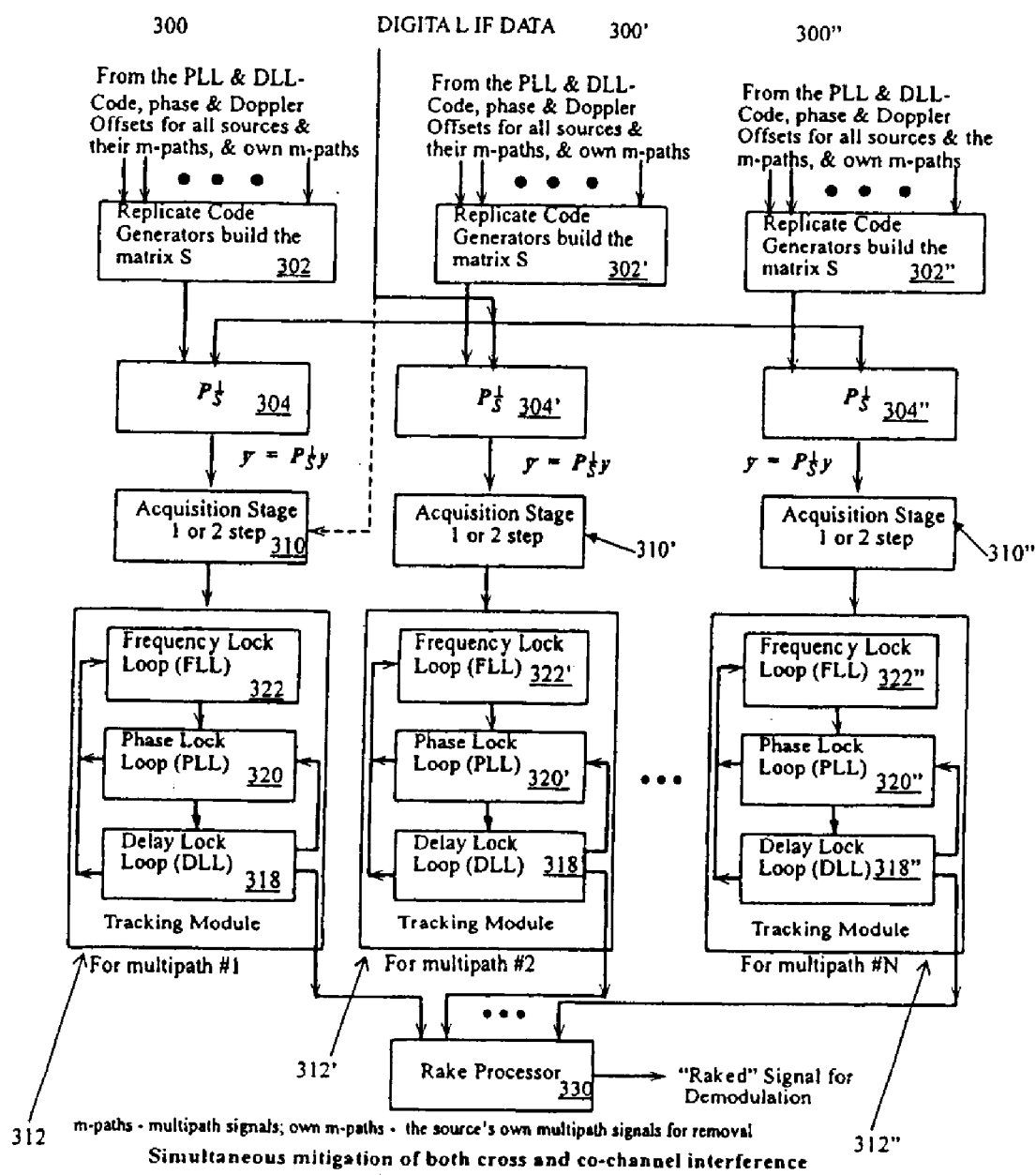
Figure 4:
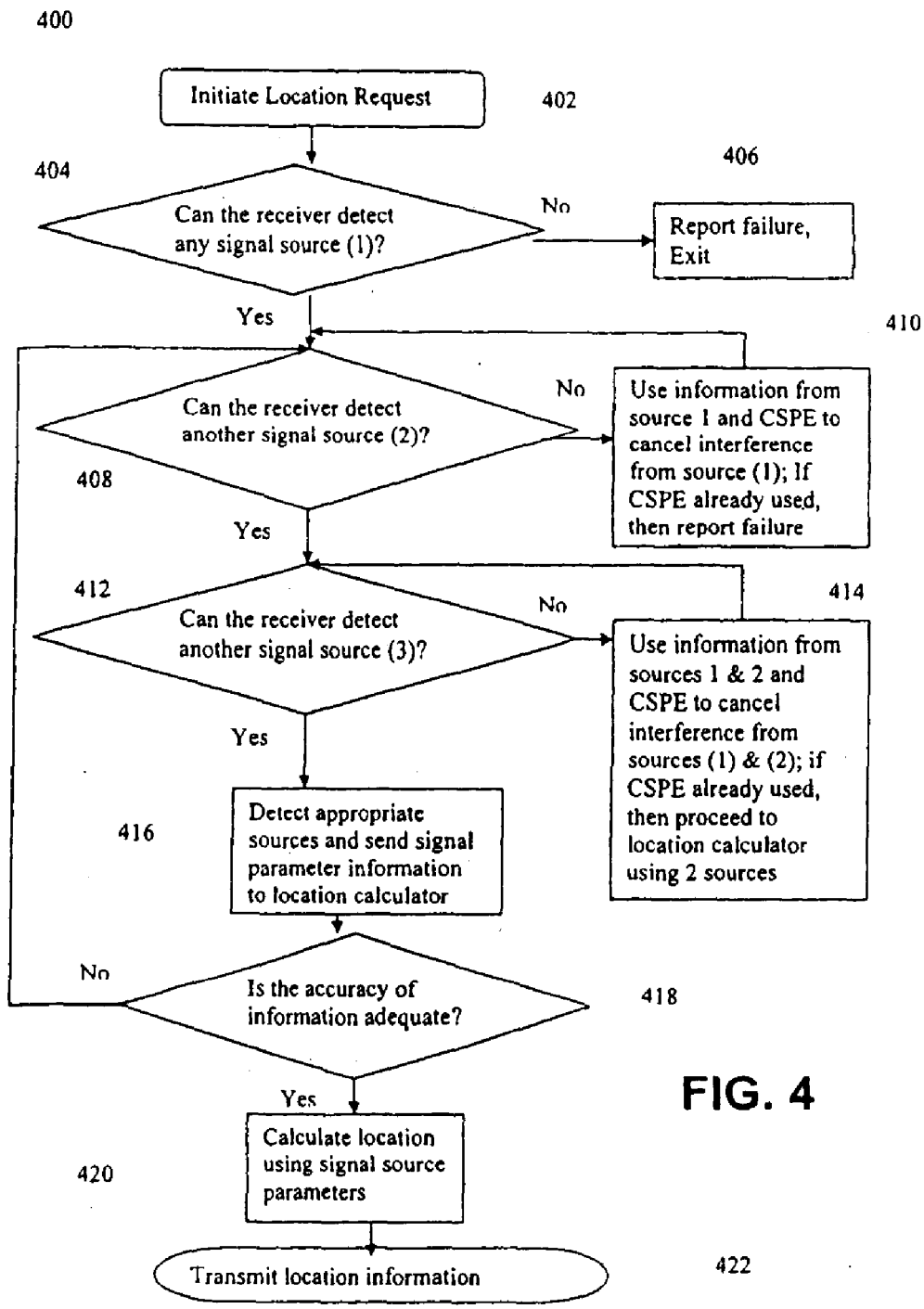

FIG. 7 is a flowchart illustrating the use of the invention in a network-based solution 700 for location. The location request 702 is forwarded to the base station by the base station controller, at which point the base station checks to see if it can detect the signal from the mobile transmitter

704. If so, then the timing information may be used to compute location as illustrated by block 706. In the event that it cannot and CSPE has not been used 708, possibly because of interference from the mobiles it is serving, it uses the information about the interfering mobiles to remove the interference using the orthogonal projection of the signal in the subspace spanned by the interference 712, and then seeing if the mobile transmitter in question (the one requesting location service) may be detected. If CSPE has been used, an alternate method may be required as illustrated by ellipse 710.

Once three such base stations (or two, in some cases) can detect the mobile, then the information about the signals may be used by the network to determine the location of the mobile phone by any of the common geolocation techniques known in the art. For a detailed discussion of the techniques, the reader is referred to "Wireless location in CDMA cellular radio systems," James J. Caffery Jr., Kluver Academic, Boston, 2000. This text is hereby incorporated by reference. It should be appreciated that the present invention is not limited to the use of Time Difference of Arrival (TDOA), Angle of Arrival (AOA) or any combination of these techniques for geolocation and that other known geolocation methods may be utilized and are considered within the scope of the present invention.

Hybrid Solutions

There are some location techniques that depend on the ability of the receiver to detect a plurality of other spread spectrum signals, like GPS signals. This invention may also be used to allow for an interfering GPS signal to be cancelled in order for the GPS receiver to receive and detect additional GPS signal(s). This approach would be similar to that as described in the forward and reverse link situations except that the signal would be a GPS signal.

Some techniques involve a combination of GPS signals and information about CDMA signals to compute location, and those skilled in the art will realize that this invention may be used in a receiver that utilizes any combination of such signals to compute location.

In any of the three systems discussed above, only the time(s) of arrival of the signals from different sources are important for the location computation, and not any specific message. The focus of this invention will be on acquiring and tracking pilot signals. For the purposes of this invention, and in general, for calculating the location of a mobile, the objective is to obtain an adequately high signal-to-noise ratio in the correlation of at least two, and preferably, three pilot signals from different base station.

Figure 5A:
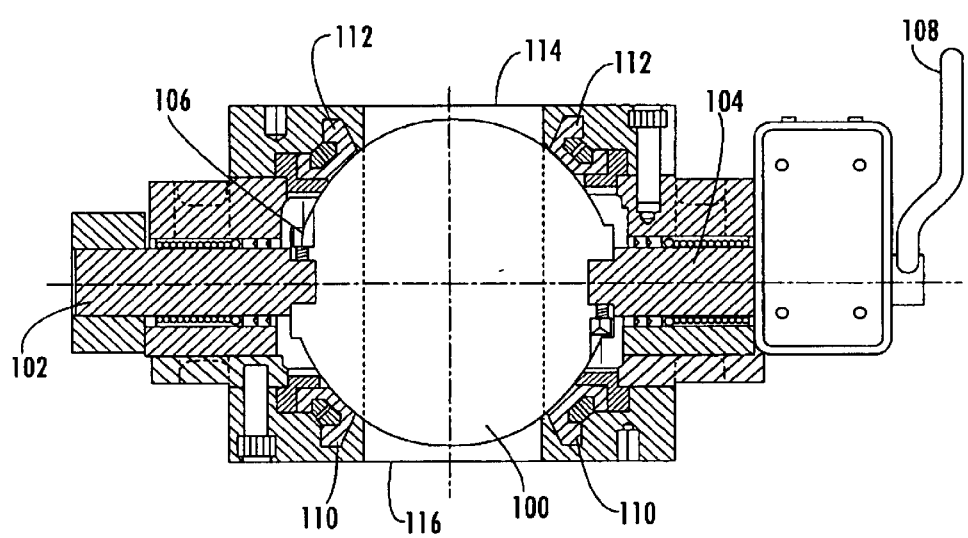
FIG. 5 is a flowchart illustrating the steps associated with how the correlation length is adjusted in order to increase the Signal-to-Noise ratio in the device in FIG. 3.
Figure 5B:
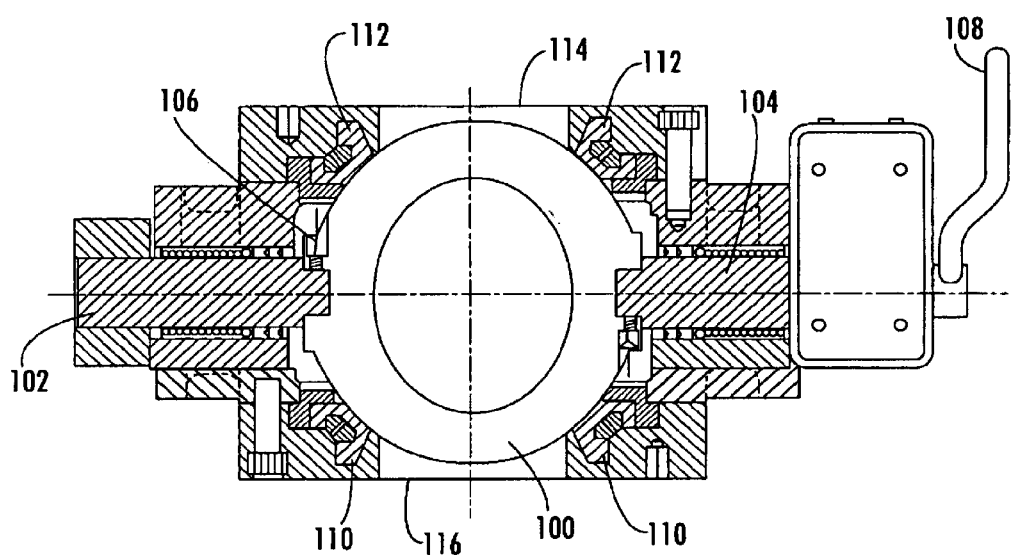
Figure 6A:
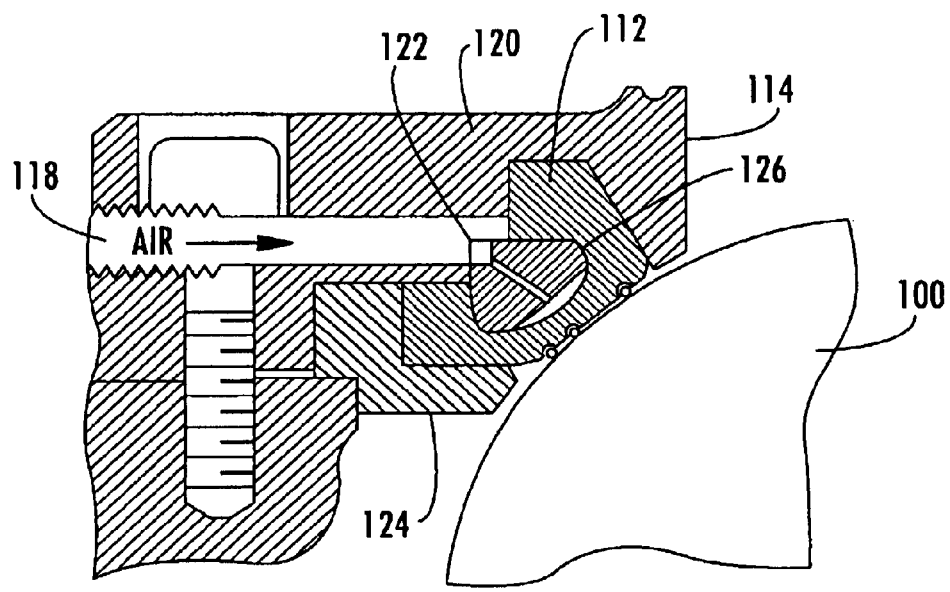
FIG. 6 shows the invention being utilized in a receiver structure modeled after CDMA2000 standards.
Figure 6B:
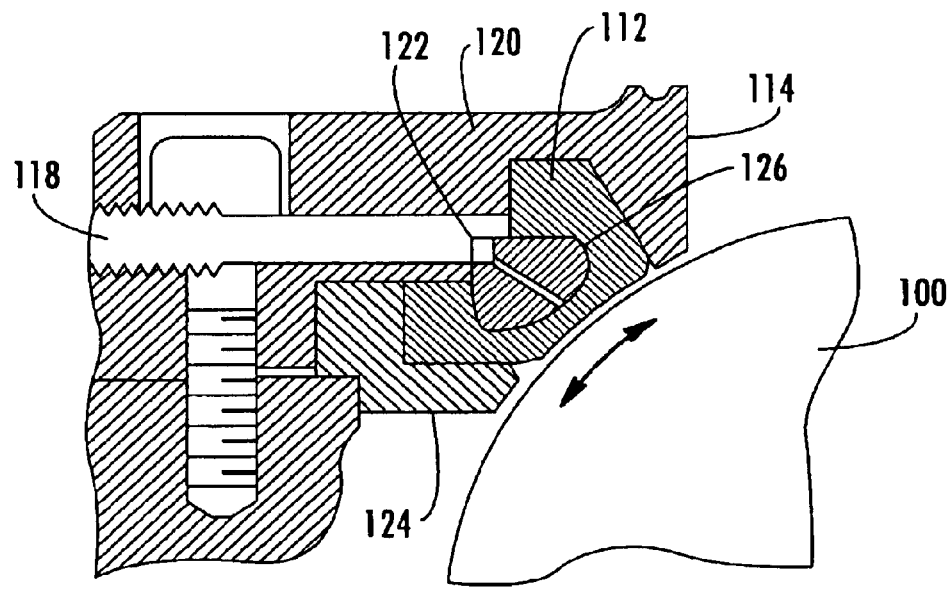

Under these circumstances, increasing the correlation length may increase the SNR of the different pilots for the same signal. FIG. 5 illustrates the use of this technique 500 that may be utilized in conjunction with the CSPE technique described in FIG. 4. In a preferred embodiment, the correlation length is increased only up to the point where the pilot signals are detected and tracked, so as to not unduly increase the computational load. As may be seen in FIG. 5, the first step is to start with the minimum correlation length. This is illustrated by ellipse 502. Next, the correlation length is increased by either a predetermined amount or a variable amount as is illustrated by block 504. Next, a determination is made to see if the source signal-to-noise ratio is acceptable as is illustrated by decision diamond 506. If it is acceptable, then one would return to the technique described in FIG. 4 and illustrated by block 508. Otherwise, decision diamond 510 is utilized to determine if the correlation length is at the maximum. If the result is true, then a failure is logged and one is returned to the calling routine as illustrated by ellipse 512. Otherwise, one returns to step 504 and repeats the process.

An essential feature of the present invention is to test the incoming received composite signal, which may include multiple sources and noise, for the presence of at least two and preferably three different signal sources. The detection of the source may be by means of the searcher that is currently used in the art for the blind acquisition of pilot signals, or may be by means of a dedicated position location searcher. The essential feature of these detectors, referred to as acquisition modules, is to correlate the incoming signal with different phase offsets of the PN short codes used to distinguish one signal source from another, in the case of the forward link, and with different long code phase offsets, in the case of the reverse link. Based on the results of this acquisition step and detection of sources, and on the number of sources obtained, the receiver makes use of the method illustrated in FIG. 4 to decide whether or not to invoke the CSPE. If the number of signal sources detected is not adequate to determine location, the CSPE then cancels the interference from the detected source(s) in order to detect buried signal sources that are now detectable, and which were not detectable before due to interference from the strong source. This procedure continues until either the requisite number of sources is detected, or the receiver is unable to detect adequate number of sources, even with the cancellation of interference.

The implementation of this invention in a baseline receiver will require a minor modification of the receiver. The receiver must be modified to facilitate the change in the finger assignment procedure when a location request is made. In baseline receivers, the fingers of the rake receiver lock on to the strongest signals available, sometimes multi-path versions of the same signal, in order to be able to obtain a more favorable bit error rate when demodulating the desired signal. However, during a location computation, it is more critical that the fingers of the rake receiver lock onto two or preferably three different signal sources in order for the receiver to be able to accurately determine the mobile's location. In any case, the specific nature of the way in which this invention is implemented in the receiver is not critical to the teachings of the present invention. The particular modifications to the receiver are the subject matter of a different patent application. Therefore, these hardware issues will be discussed briefly, below.

In one embodiment, one finger acts as the searcher receiver to detect the presence of different signal sources, and the finger assigner allocates the fingers such that the strong sources are projected out from the signal in order for the succeeding fingers to be able to detect the weaker sources. In an emergency situation, the location computation would take precedence over normal traffic. While the location is being ascertained, the three available fingers must be constrained to track different sources.

Figure 6:
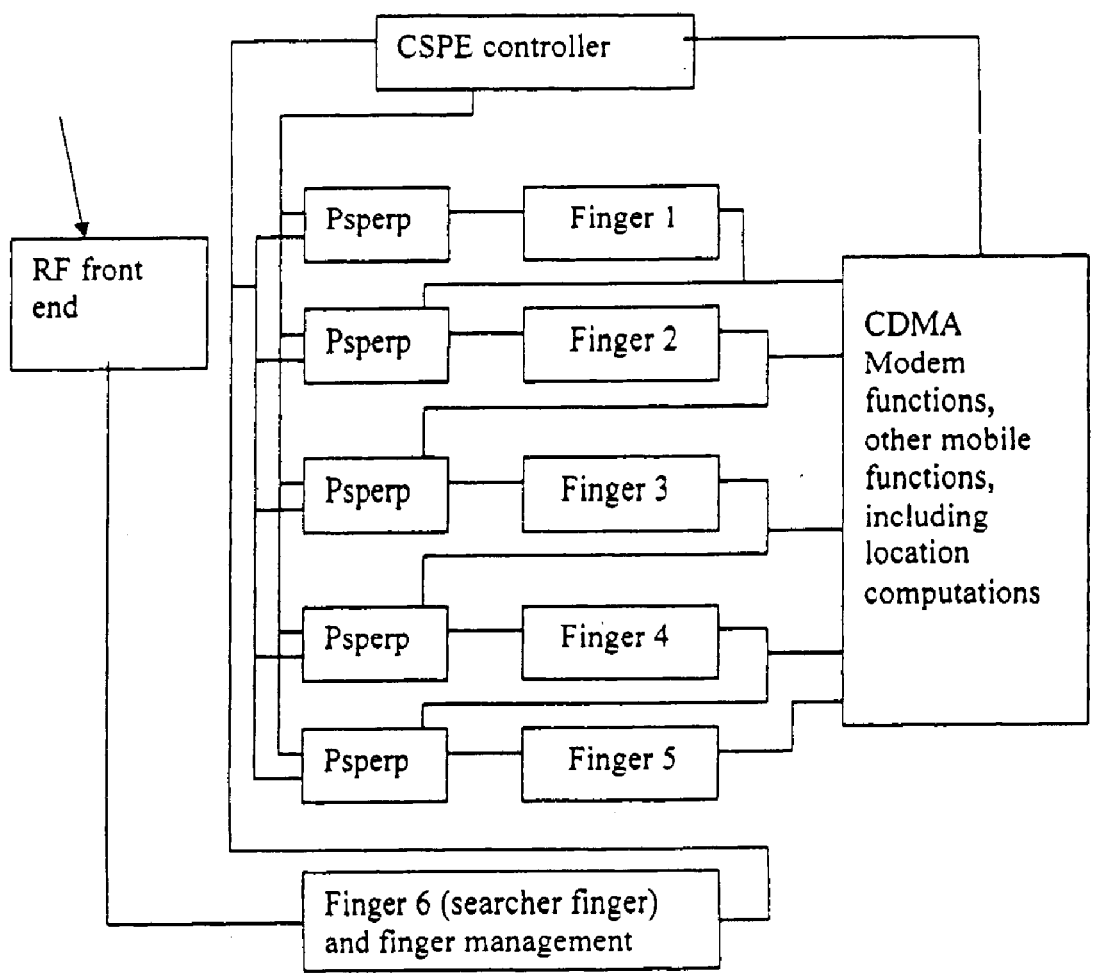
Figure 7:
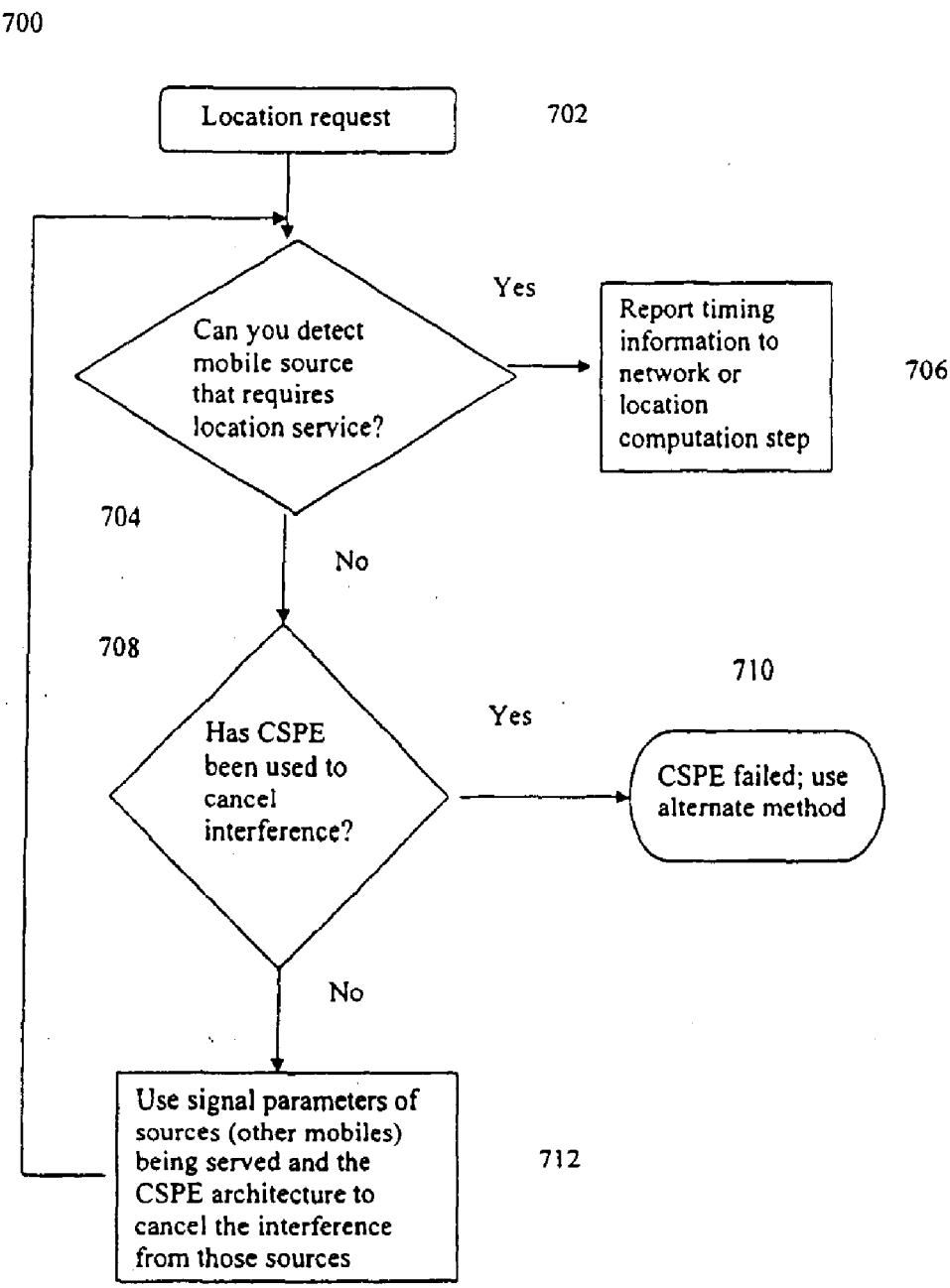

FIG. 6 shows an exemplary embodiment of the invention. Leaving the one finger for doing the searching, the next two of the remaining five fingers could be assigned to the line of sight (LOS) signal from a strong base station and the strongest multi-path of the same signal. Information from these two fingers are fed into the CSPE which then cancels the interference from the strong signal source, and the searcher now attempts to acquire the next strongest signal source. Two more fingers are assigned, in this example, to the LOS and multi-path of the second source and information from these fingers are then used in order to build the $P_s^\perp$ that cancels the interference from the two strong sources in order to be able to detect the third signal source.

It should, be noted, however, that the actual signals to be cancelled would depend on the signal strengths received for that particular case. The objective is to cancel the strongest interferers such that two or three different sources are detected. For example, it may be necessary to cancel a strong base station's LOS signal and its two multi-path signals in certain cases.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

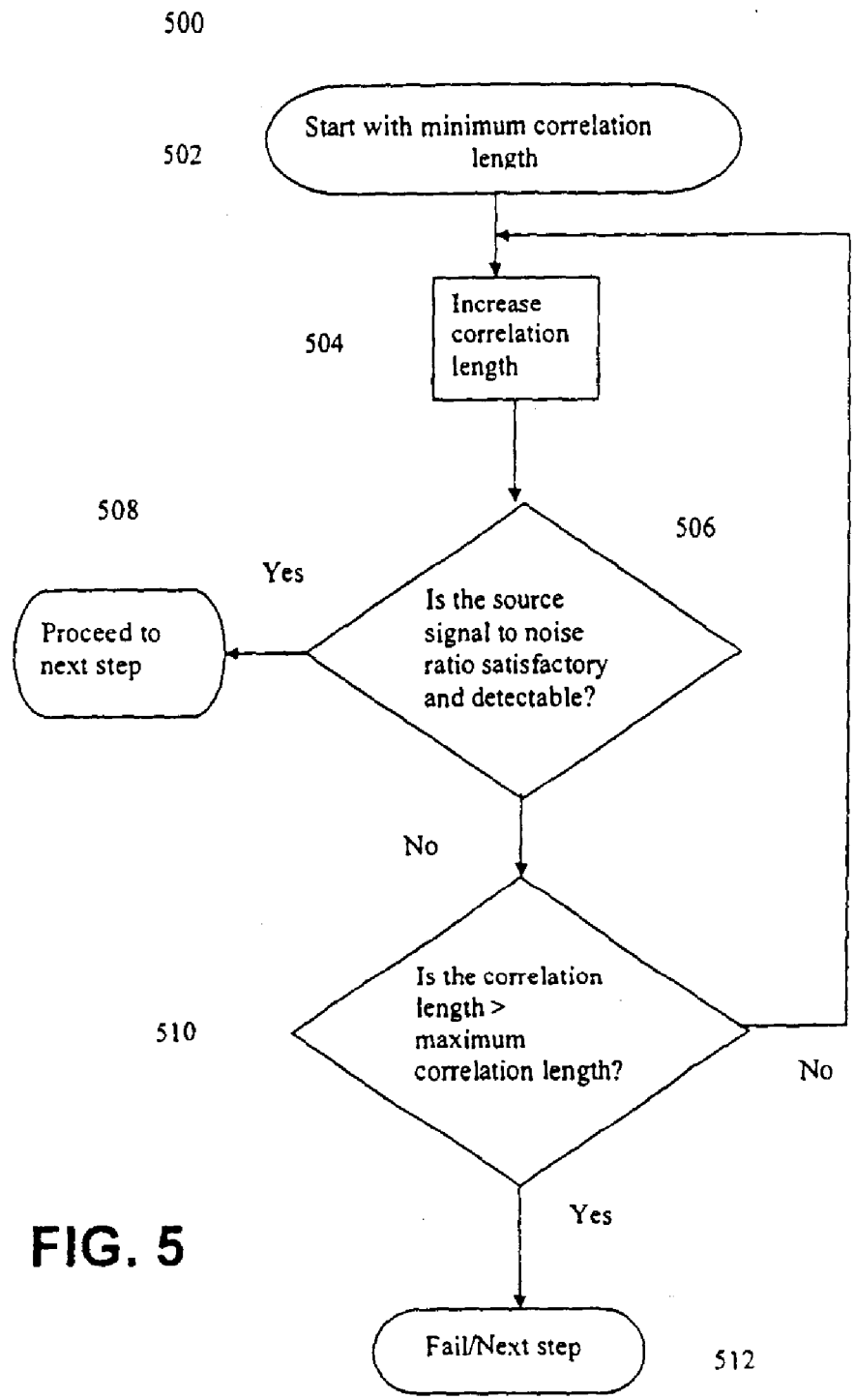

What is claimed is:

1. A method for determining geolocation of a mobile transmitter, the method comprising the steps of:
    generating a location request;
    detecting a first source signal (y1);
    generating an orthogonal projection of said first source signal;
    canceling interference from said first source signal by utilizing said orthogonal projection;
    detecting at least one more source signal (y2 ... yn); and
    utilizing said source signals to determine a location of said mobile.

2. The method recited in claim 1 wherein said first source signal is a pilot signal.

3. The method recited in claim 1 wherein said at least one more source signal is a pilot signal.

4. The method recited in claim 1 wherein at least one of said first or said at least one more source signals are also used to generate a respective orthogonal projection and respective canceling interference step.

5. The method recited in claim 1 wherein at least three source signals are detected.

6. The method recited in claim 1 wherein an advanced forward triangulation is utilized for determining said location of said mobile.

7. The method recited in claim 1 wherein a received signal comprises H, the first source signal of interest; S, the signals of all other sources and multi-path versions of the source of interest and composed of vectors $s_1, s_2, s_3 \ldots, s_p$; and noise (n); the method comprising the steps of:
    determining a basis matrix U composed of basis vectors $u_1, u_2, \ldots u_p$;
    storing elements of said basis matrix U; and
    determining $y_{perp}$ where:

$$y_{perp} = y - U(U^T U)^{-1} U^T y.$$

8. The method recited in claim 7, wherein said step of determining basis vectors comprises the steps of:
    A. assigning $s_1$ as a first basis matrix U;
    B. decomposing $s_2$ into a component which is in said basis matrix U and a component that is not ($u_2$); and
    C. redefining the basis matrix U to incorporate basis vector $u_2$.

9. The method recited in claim 8, wherein said step of determining basis vectors further comprises the steps of:
    repeating steps B and C for each element of S.

10. The method recited in claim 8, wherein said step of determining basis vectors further comprises the steps of:
    comparing $u_i$ to a predetermined threshold and if $u_i$ is greater than said threshold, adding $u_i$ to the basis and repeating steps B and C for each element of S, else ignoring the $u_i$ and continuing to repeat steps B and C.

11. The method recited in claim 8, wherein said step of determining basis vectors further comprises the steps of:
    computing $1/\sigma_i$, where $u_i^T u_i = \sigma_i$; and
    storing $u_i$ and $1/\sigma_i$.

12. The method recited in claim 8, wherein said step of computing basis vectors further comprises the steps of:

$$\text{computing } u_i = s_i - u_1 \frac{1}{\sigma_1} u_1^T s_i - u_2 \frac{1}{\sigma_2} u_2^T s_i - \ldots - u_{i-1} \frac{1}{\sigma_{i-1}} u_{i-1}^T s_i;$$

storing $u_i$ and $1/\sigma_i$; and storing $u_1$ and $1/\sigma_i$;
repeating said determining and storing steps if $u_i$ is above a predetermined threshold, else ignoring this particular $u_i$.

13. The method recited in claim 7, wherein said step of determining $Y_{perp}$ comprises the step of calculating $Y_{perp}$ with the following formula:

$$y_{perp} = y - U \begin{bmatrix} \frac{1}{\sigma_1} & 0 & \cdot & \cdot & 0 \\ 0 & \frac{1}{\sigma_2} & \cdot & \cdot & 0 \\ \cdot & & \cdot & \cdot & \cdot \\ \cdot & & & \cdot & \cdot \\ 0 & 0 & \cdot & \cdot & \frac{1}{\sigma_p} \end{bmatrix} U^T y.$$

14. The method recited in claim 7, wherein said step of determining $Y_{perp}$ comprises the step of calculating $Y_{perp}$ with the following formula:

$$y_{perp} = y - u_1 \frac{1}{\sigma_1} u_1^T y - u_2 \frac{1}{\sigma_2} u_2^T y - \ldots u_{p-1} \frac{1}{\sigma_{p-1}} u_{p-1}^T y - u_p \frac{1}{\sigma_p} u_p^T y.$$

15. The method recited in claim 7, further comprising a step of determining $y_s$ where:

$$y_s = U(U^T U)^{-1} U^T y.$$

16. The method recited in claim 1 wherein a received signal comprises H, a spread signal matrix of the source of interest; S, the spread signal matrix of all other sources of interest and composed of vectors $s_1, s_2, s_3 \ldots, s_p$; and noise (n); the method comprising the steps of:
    A. assigning $s_1$ as a first basis vector $u_1$;
    B. determining $\sigma_i$, where $u_i^T u_i = \sigma_i$;
    C. storing $u_i$;
    D. computing of inner products of the $s_{i+1}$ and the $u_1$ through $u_i$ vectors;
    E. multiplying said inner product with a respective scalar $1/\sigma_i$ and thereby creating a first intermediate product;
    F. scaling each respective basis vector $u_i$ by multiplying each respective first intermediate product with each respective basis vector $u_i$;
    G. obtaining a vector sum from step F;
    H. subtracting said vector sum from $s_{i+1}$ to obtain the next basis vector $u_{i+1}$;
    I. comparing $u_{i+1}$ to a predetermined value and if equal to or less than said value, discarding the $u_{i+1}$ and going to step N;

J. storing $u_{i+1}$;

K. determining an inner product of $u^T_{i+1}u_{i+1}$;

L. determining the reciprocal of step K which is $1/\sigma_{i+1}$;

M. storing $1/\sigma_{i+1}$;

N. incrementing i;

O. conducting steps D through N until i=p, where p is the total number of said sources of interest; and P. determining $y_{perp}$ where:

$$Y_{perp}=y-U(U^TU)^{-1}U^Ty.$$

17. The method recited in claim 16, wherein said computing step (D) is conducted in series.

18. The method recited in claim 16, wherein said computing step (D) is conducted in parallel.

19. The method recited in claim 16, wherein said multiplying step (E) is conducted in series.

20. The method recited in claim 16, wherein said multiplying step (E) is conducted in parallel.

21. The method recited in claim 16, wherein said scaling step (F) is conducted in series.

22. The method recited in claim 16, wherein said scaling step (F) is conducted in parallel.

23. The method recited in claim 16, wherein said storing step (C) also stores $\sigma_i$.

24. The method recited in claim 16, wherein said storing step (C) also stores $1/\sigma_i$.

25. The method recited in claim 16, wherein said inner product step (K) is conducted in series.

26. The method recited in claim 16, wherein said inner product step (K) is conducted in parallel.

27. The method recited in claim 1 wherein a received signal comprises H, a spread signal matrix of the source of interest; S, the spread signal matrix of all other sources of interest and composed of vectors $s_1,s_2,s_3,\ldots,s_p$; and noise (n); the method comprising the steps of:

A. assigning $s_1$ as a first basis vector $u_1$;

B. determining $\sigma_i$, where $u_i^Tu_i=\sigma_i$;

C. storing $u_i$;

D. computing of inner products of the $s_{i+1}$ and the $u_1$ through $u_i$ vectors;

E. multiplying said inner product with a respective scalar $1/\sigma_i$ and thereby creating a first intermediate product;

F. scaling each respective basis vector $u_i$ by multiplying each respective first intermediate product with each respective basis vector $u_i$;

G. serially subtracting said intermediate product from $s_{i+1}$;

H. utilizing the result from step G and subtracting the next incoming value of $$u_i\frac{1}{\sigma_i}u_i^Ts_{i+1}$$

until all are the values processed;

I. obtaining the next basis vector $u_{i+1}$ from step H;

J. comparing $u_{i+1}$ to a predetermined value and if equal to or less than said value, discarding $u_{i+1}$ and going to step O;

K. storing $u_{i+1}$;

L. determining an inner product of $u^T_{i+1}u_{i+1}$;

M. determining the reciprocal of step K which is $1/\sigma_{i+1}$;

N. storing $1/\sigma_{i+1}$;

O. incrementing i;

P. conducting steps D through O until i=p, where p is the total number of said sources of interest; and Q. determining $y_{perp}$, where:

$$y_{perp}=y-U(U^TU)^{-1}U^Ty.$$

28. The method recited in claim 27, wherein said computing step (D) is conducted in series.

29. The method recited in claim 27, wherein said computing step (D) is conducted in parallel.

30. The method recited in claim 27, wherein said multiplying step (E) is conducted in series.

31. The method recited in claim 27, wherein said multiplying step (E) is conducted in parallel.

32. The method recited in claim 27, wherein said scaling step (F) is conducted in series.

33. The method recited in claim 27, wherein said scaling step (F) is conducted in parallel.

34. The method recited in claim 27, wherein said storing step (C) also stores $\sigma_i$.

35. The method recited in claim 27, wherein said storing step (C) also stores $1/\sigma_i$.

36. The method recited in claim 27, wherein said inner product step (L) is conducted in series.

37. The method recited in claim 27, wherein said inner product step (L) is conducted in parallel.

38. An apparatus for determining geolocation of a mobile transmitter, the apparatus comprising:

means for generating a location request;

means for detecting a first source signal (y1);

means for generating an orthogonal projection of said first source signal;

means for canceling interference from said first source signal by utilizing said orthogonal projection;

means for detecting at least one more source signal (y2 . . . yn); and means for utilizing said first and said at least one more source signals to determine the geolocation of said mobile transmitter.

39. The apparatus recited in claim 38 wherein said first source signal is a pilot signal.

40. The apparatus recited in claim 38 wherein said at least one more source signal is a pilot signal.

41. The apparatus recited in claim 38 wherein at least one of said first and said at least one more source signals are also used in generate a respective orthogonal projection and respective canceling interference step.

42. The apparatus recited in claim 38 wherein at least three source signals are detected.

43. The apparatus recited in claim 38 wherein an advanced forward triangulation is utilized for determining said geolocation of said mobile transmitter.

44. The apparatus recited in claim 38, wherein said first signal comprising H, a signal of the source of interest; S, the signals of all other sources and composed of vectors $s_1,s_2,s_3\ldots,s_p$; and noise (n); the apparatus further comprising:

means for determining a basis vector U;

means for storing elements of said basis vector U; and means determining $y_{perp}$ where: $y_{perp}=Y-U(U^TU)^{-1}U^Ty$.

45. The apparatus recited in claim 38, wherein said first signal comprising H, a spread signal matrix of the source of interest; S, the spread signal matrix of all other sources of interest and composed of vectors $s_1, s_2, s_3 \ldots, s_p$; and noise (n); the apparatus further comprising:

A. means for assigning $s_1$ as a first basis vector $u_1$;
  B. means for determining $\sigma_i$, where $u_i^T u_i = \sigma_i$;
  C. means for storing $u_i$;
  D. means for computing of inner products of the $s_{i+1}$ and the $u_1$ through $u_1$ vectors;
  E. means for multiplying said inner product with a respective scalar $1/\sigma_i$ and thereby creating a first intermediate product;
  F. means for scaling each respective basis vector $u_i$ by multiplying each respective first intermediate product with each respective basis vector $u_i$;
  G. means for obtaining a vector sum from step F;
  H. means for subtracting said vector sum from $s_{i+1}$ to obtain the next basis vector $u_{i+1}$;
  I. means for comparing $u_{i+1}$ to a predetermined value and if equal to or less than said value, discarding this $u_{i+1}$ and going to step N;
  J. means for storing $u_{i+1}$;
  K. means for determining an inner product of $u^T_{i+1} u_{i+1}$;
  L. means for determining the reciprocal of step K which is $1/\sigma_{i+1}$;
  M. means for storing $1/\sigma_{i+1}$;
  N. means for incrementing i;
  O. means for conducting steps D through N until i=p, where p is the total number of said sources of interest; and
  P. means for determining $y_{perp}$ where: $y_{perp} = y - U(U^T U)^{-1} U^T y$.

46. The apparatus recited in claim 38, wherein said first signal comprising H, a spread signal matrix of the source of interest; S, the spread signal matrix of all other sources of interest and composed of vectors $s_1, s_2, s_3 \ldots, s_p$; and noise (n); the apparatus further comprising:

A. means for assigning $s_1$ as a first basis vector $u_1$;
  B. means for determining $\sigma_i$, where $u_i^T u_1 = \sigma_i$;
  C. means for storing $u_i$;
  D. means for computing of inner products of the $s_{i+1}$ and the $u_1$ through $u_i$ vectors;
  E. means for multiplying said inner product with a respective scalar $1/\sigma_i$ and thereby creating a first intermediate product;
  F. means for scaling each respective basis vector $u_i$ by multiplying each respective first intermediate product with each respective basis vector $u_i$;
  G. means for serially subtracting said intermediate product from $s_{i+1}$;
  H. means for utilizing the result from step G and subtracting the next incoming value $$u_i \frac{1}{\sigma_i} u_i^T s_{i+1}$$

until all the values are processed;
  I. means for obtaining the next basis vector $u_{i+1}$ from step H;
  J. means for comparing $u_{i+1}$ to a predetermined value and if equal to or less than said value, going to step O;
  K. means for storing $u_{i+1}$;
  L. means for determining an inner product of $u^T_{i+1} u_{i+1}$;
  M. means for determining the reciprocal of step K which is $1/\sigma_{i+1}$;
  N. means for storing $1/\sigma_{i+1}$;
  O. means for incrementing i;
  P. means for conducting steps D through O until i=p, where p is the total number of said sources of interest; and
  Q. means for determining $y_{prep}$ where: $y_{perp} = y - U(U^T U)^{-1} U^T y$.

47. An apparatus for determining geolocation of a mobile, the apparatus comprising:

means for generating a location request;
  means for detecting a first source signal (y1);
  means for generating an orthogonal projection of said first source signal;
  means for canceling interference from said first source signal by utilizing said orthogonal projection;
  means for detecting at least one more source signal (y2 . . . yn); and
  means for utilizing said first and said at least one more source signals to determine the location of said mobile.

48. The apparatus recited in claim 47 wherein said first source signal is a pilot signal.

49. The apparatus recited in claim 47 wherein said at least one more source signal is a pilot signal.

50. The apparatus recited in claim 47 wherein at least one of said first and said at least one more source signals are also used to generate a respective orthogonal projection and respective canceling interference step.

51. The apparatus recited in claim 47 wherein at least three source signals are detected.

52. The apparatus recited in claim 47 wherein an advanced forward triangulation is utilized for determining said location of said mobile.

53. The apparatus recited in claim 47 wherein said first source signal comprises H, a signal of the source of interest; S, the signals of all other sources and multi-path versions of the source of interest and composed of vectors $s_1, s_2, s_3 \ldots, s_p$; and noise (n); the apparatus comprising:

means for determining a basis matrix U composed of basis vectors $u_1, u_2, \ldots u_p$;
  means for storing elements of said basis matrix U;
  means for determining $y_{perp}$ where:

$$y_{perp} = y - U(U^T U)^{-1} U^T y;\text{ and}$$

means for determining $y_s$ where:

$$y_s = U(U^T U)^{-1} U^T y.$$

54. The apparatus recited in claim 16, further comprising means for determining $y_s$ where:

$$y_s = U(U^T U)^{-1} U^T y.$$

55. The apparatus recited in claim 27, further comprising means for determining $y_s$ where:

$$y_s = U(U^T U)^{-1} U^T y.$$

56. An apparatus for determining geolocation of a mobile, the apparatus comprising:

means for generating a location request from a base station;
  means for detecting a first source signal (y1) from said mobile;

means for generating an orthogonal projection of said first source signal;

means for canceling interference from said first source signal by utilizing said orthogonal projection;

means for detecting at least one more source signal (y2 ... yn); and means for utilizing said source signals to determine the location of said mobile.

57. The apparatus recited in claim 56 wherein said first source signal is a pilot signal.

58. The apparatus recited in claim 56 wherein said at least one more source signal is a pilot signal.

59. The apparatus recited in claim 56 wherein at least one of said one or more source signals are also used in generate a respective orthogonal projection and respective canceling interference step.

60. The apparatus recited in claim 56 wherein at least three source signals are detected.

61. The apparatus recited in claim 56 wherein an advanced forward triangulation is utilized for determining said location of said mobile transmitter.

62. The apparatus recited in claim 56 wherein said first source signal comprising H, a signal of the source of interest; S, the signals of all other sources and composed of vectors $s_1, s_2, s_3 \ldots , s_p$; and noise (n); the apparatus comprising:

means for determining a basis vector U;

means for storing elements of said basis vector U;

means for determining $y_{perp}$ where: $y_{perp} = y - U(U^T U)^{-1} U^T y$;

means for determining $y_s$ where:

$$y_s = U(U^T U)^{-1} U^T y.$$

63. A method for determining geolocation of a mobile transmitter, the method comprising the steps of:

A. generating a location request;

B. detecting a first source signal (y1);

C. assigning a first pre-determined correlation length to a variable N;

D. increasing said correlation length N by an amount Y;

E. determining signal to noise ratio of said first source signal (y1);

F. comparing said signal to noise ratio to a predetermined threshold to determine if said signal to noise ratio is equal to or above said threshold, if below said threshold, then initiating step G otherwise, initiating step H;

G. comparing said correlation length to a predetermined maximum correlation length and if below said maximum correlation length, returning to step D, otherwise going to step H;

H. generating an orthogonal projection of said first source signal;

I. canceling interference from said first source signal by utilizing said orthogonal projection;

J. detecting at least one more source signal (y2 ... yn); and

K. utilizing said source signals to determine the geolocation of said mobile transmitter.

64. The method recited in claim 63 wherein said amount Y is a fixed amount.

65. The method recited in claim 63 wherein said amount Y is a variable amount.

66. A method for determining geolocation of a mobile transmitter, the method comprising the steps of:

A. generating a location request;

B. detecting a first source signal (y1) at a first base station;

C. generating an orthogonal projection of said first source signal;

D. canceling interference from said first source signal by utilizing said orthogonal projection;

E. detecting said first signal source (y1) at least one more base station; and

F. utilizing timing information of said source signal to determine the geolocation of said mobile transmitter.

67. An apparatus for determining geolocation of a mobile transmitter, the apparatus comprising: means for generating a location request; means for detecting a first source signal (y1) at a first base station; means for generating an orthogonal projection of said first source signal; means for canceling interference from said first source signal by utilizing said orthogonal projection; means for detecting said first signal source (y1) at least one more base station; and means for utilizing timing information of said source signal to determine the geolocation of said mobile transmitter.

* * * * *

UNITED STATES PATENT AND TRADEMARK OFFICE
CERTIFICATE OF CORRECTION

PATENT NO.    : 6,750,818 B2
DATED         : June 15, 2004
INVENTOR(S)   : John K. Thomas and Anand P. Narayan It is certified that error appears in the above-identified patent and that said Letters Patent is hereby corrected as shown below:

Drawings,
Figures 1-7 are not associated with the above-mentioned patent. The patent issued with the incorrect drawings which are not relevant to any of the Applicants' inventions. These incorrect drawings are the drawings fo another Applicant. The correct drawings, as approved by the by the Office, for the above-mentioned patent are attached herewith.

Signed and Sealed this

Twenty-fourth Day of August, 2004

JON W. DUDAS
*Director of the United States Patent and Trademark Office*

(PRIOR ART)